United States Patent

Aitani et al.

[11] Patent Number: 6,055,332
[45] Date of Patent: Apr. 25, 2000

[54] HANDWRITTEN CHARACTER AND SYMBOL PROCESSING APPARATUS AND MEDIUM WHICH STORES CONTROL PROGRAM OF HANDWRITTEN CHARACTER AND SYMBOL PROCESSING APPARATUS

[75] Inventors: Yasuhiro Aitani, Yamatokoriyama; Masashi Amano, Nara, both of Japan

[73] Assignee: Sharp K.K., Osaka, Japan

[21] Appl. No.: 09/015,765

[22] Filed: Jan. 29, 1998

[30] Foreign Application Priority Data

Jan. 29, 1997 [JP] Japan ................................. 9-015596

[51] Int. Cl.[7] .............................. G06K 9/00; G06K 9/18
[52] U.S. Cl. ...................... 382/186; 382/181; 382/187; 382/188
[58] Field of Search ................................. 382/186, 187, 382/188, 189, 312, 181

[56] References Cited

U.S. PATENT DOCUMENTS

| | | | |
|---|---|---|---|
| 5,454,046 | 9/1995 | Carman, II | 382/186 |
| 5,517,578 | 5/1996 | Altman et al. | 382/186 |
| 5,613,019 | 3/1997 | Altman et al. | 382/189 |
| 5,781,662 | 7/1998 | Mori et al. | 382/186 |
| 5,812,697 | 9/1998 | Sakai et al. | 382/186 |
| 5,828,783 | 10/1998 | Ishigaki | 382/186 |
| 5,862,251 | 1/1999 | Al-Karmi et al. | 382/186 |
| 5,875,256 | 2/1999 | Brown et al. | 382/186 |
| 5,889,889 | 3/1999 | Sinden | 382/186 |

FOREIGN PATENT DOCUMENTS 4-313175   11/1992   Japan .

OTHER PUBLICATIONS

"New Fourier Descriptor Applicable Even in an Open Curve"; *Journal of Telecommunications Society*, 84/3, vol. 6–A, No. 3, 1984; pp. 166–173.

R. Bellman et al.; "Optimal Trajectories"; *Applied Dynamic Programming*, 1962; pp. 207–233.

Alex Poon et al.; "Scribbler: A Tool for Searching Digital Ink", *CHI'95 Mosaic of Creativity*, May 7–11, 1995; pp. 252–253.

*Primary Examiner*—Phuoc Tran
*Assistant Examiner*—Daniel G. Mariam

[57] ABSTRACT

A purpose of the handwriting recognition device is to retrieve handwritten characters and symbols at high speed and easily. The stroke data input from the stroke data input part through handwritten input is subjected to the approximate reforming process and single-stroking process to prepare the single-stroke data. By subjecting the single-stroke data to the complex Fourier transform process, the Fourier coefficient is obtained and the number of strokes is obtained. During registration, the dictionary Fourier coefficient and the dictionary stroke number, and the dictionary stroke data are stored in the dictionary memory in relation to each other. During retrieval, the retrieval Fourier coefficient and the retrieval stroke number are stored temporarily in the temporary memory. Furthermore, the dictionary stroke data are narrowed down according to the result of the comparison of the stroke numbers, and the dictionary stroke data is determined according to the result of the comparison of the Fourier coefficient.

8 Claims, 17 Drawing Sheets

HANDWRITTEN CHARACTER AND SYMBOL PROCESSING APPARATUS AND MEDIUM WHICH STORES CONTROL PROGRAM OF HANDWRITTEN CHARACTER AND SYMBOL PROCESSING APPARATUS

BACKGROUND OF THE INVENTION

1. Field of the Invention

The present invention relates to a handwritten character and symbol processing apparatus capable of registering stroke data obtainable by handwriting input of characters, symbols, or the like in character string units and retrieving the stroke data. Further, it relates to a medium which stores a control program of the handwritten character and symbol processing apparatus.

2. Description of the Related Art

A handwritten character and symbol processing apparatus comprises: an input part substantiated by a tablet or the like having an input surface to which characters or symbols are input by means of a predetermined input pen, the input part outputting stroke data of the input characters or symbols; a storage part for storing the stroke data from the input part by registering in a dictionary; a display part for displaying characters or symbols based on the input stroke data, and displaying characters or symbols based on a first proposal stroke data selected from among stroke data resulting by performing a character recognition and dictionary registration on said stroke data; and a control part for controlling the operations of the above parts.

In the handwritten character and symbol processing apparatus of the prior art, the character recognition process is performed in single-character units. Thus when a character string is input continuously by handwriting, the obtained stroke data are cut into stroke data of a predetermined segment unit, e.g. 1 character, after which the stroke data are encoded and stored. A device of the prior art that performs the character recognition process in single character units is disclosed in Japanese Unexamined Patent Publication JP-A 4-313175(1992), for example.

In the handwritten character and symbol processing apparatus of the prior art, characters or symbols can be input by handwriting on the tablet by means of the input pen as if they are written on a notebook. As mentioned above, however, since the character recognition process is performed in specified units, e.g. 1 character, the cutting process is required. If the cutting process is inappropriate, a proposal character may not be selected, or may be quite different from a desired character even if the proposal character can be selected. Consequently, it is essential to check whether or not the cutting process was performed appropriately and to make corrections when the cutting process was inappropriate. However, such operations will cause to elongate the time required for the character recognition process. Also, these operations annoy the operator.

SUMMARY OF THE INVENTION

It is an object of the invention to provide a handwritten character and symbol processing apparatus capable of retrieving the characters or symbols input by handwriting rapidly and easily. It is a further object to provide a medium which stores a control program for the device.

The invention provides a handwritten character and symbol processing apparatus comprising:

stroke data input means having an input surface upon which characters, symbols, and the like, are input by handwriting using specified indication means, and for outputting stroke data representative of a track on the indication means from the start of indication to the end of the indication by the indication means;

ink bundle data preparation means for preparing ink bundle data from stroke data of a predetermined character string unit among the stroke data;

dictionary storage means for storing the ink bundle data as dictionary ink bundle data and the stroke data of the predetermined character string unit as dictionary stroke data in relation to each other, during stroke data registration;

temporary storage means for temporarily storing the ink bundle data as retrieval ink bundle data, during stroke data retrieval; and retrieval means for selecting the dictionary stroke data related to the dictionary ink bundle data which best approximates the retrieval ink bundle data by comparing the dictionary ink bundle data and the retrieval ink bundle data.

According to the invention, ink bundle data of a character string unit is prepared from the stroke data input by handwriting. During registration, the dictionary ink bundle data and the dictionary stroke data are stored in relation to each other. During retrieval, the retrieval ink bundle data of a retrieval keyword is temporarily stored. Furthermore, dictionary and retrieval ink bundle data are compared during retrieval, and the dictionary stroke data related to the dictionary ink bundle data which best approximates the retrieval ink bundle data is selected.

Thus, registration and retrieval are performed in ink bundle units, so a cutting operation of the input stroke data into segment units (e.g., one character or radical) becomes unnecessary. As a result, the process time required for the cutting process becomes unnecessary. Also, the operator does not need to successively check the results of the cutting process and to correct inappropriate results. Furthermore, because comparison is performed in ink bundle units during retrieval, the amount of data in one unit increases and a number of data to be compared decreases, as compared to the comparison in segment units. Consequently, it becomes possible to process at high speed, even during the retrieval process of a continuously input character string, and it becomes possible to retrieve through a simple operation. Also, because the cutting operation is not performed, the drop in retrieval accuracy caused by inappropriate cutting is eliminated, so stable retrieval results can be obtained. Also, the operator's train of thought is not interrupted, so it is possible to input by handwriting without interrupting the character string. By processing in ink bundle units, it is possible to retrieve a character string having an approximate character string shape, regardless of the shape of details.

The invention is characterized in that the ink bundle data preparation means comprises:

single-stroking means for preparing single-stroke data by single-stroking the stroke data of the predetermined character string unit, and orthogonal basis transform means for approximating the single-stroke data by a predetermined number of broken lines of equal length and regarding a unit direction vector string of the broken lines as a complex-valued function for the length of the broken lines, to determine a transform coefficient with a basis of an orthogonal function;

the dictionary storage means comprises dictionary transform coefficient storage means for storing the transform coefficient as a dictionary transform coefficient and the dictionary stroke data in relation to each other, during registration;

the temporary storage means comprises retrieval transform coefficient storage means for temporarily storing the transform coefficient as a retrieval transform coefficient, during retrieval; and the retrieval means compares the dictionary transform coefficient and the retrieval transform coefficient to select the dictionary stroke data related to the dictionary transform coefficient which best approximates the retrieval transform coefficient.

According to the invention, single-stroke data is prepared from the stroke data input by handwriting, and the transform coefficient is obtained by subjecting the single-stroke data to the orthogonal basis transform process. During registration, the dictionary transform coefficient and the dictionary stroke data are stored in relation to each other. During retrieval, the retrieval transform coefficient is stored temporarily. Also during retrieval, the dictionary and retrieval transform coefficients are compared, and the dictionary stroke data related to the dictionary transform coefficient that best approximates the retrieval transform coefficient is selected.

Thus, by preparing single-stroke data, retrieval is possible even in the case of cursive handwriting input. Since the retrieval is performed by comparing the transform coefficients while eliminating the matching process with a character recognition dictionary, it is possible to retrieve even symbols and diagrams not contained in the character recognition dictionary.

The invention is characterized in that:

the ink bundle data preparation means comprises single-stroking means for preparing single-stroke data by single stroking the stroke data of the predetermined character string unit;

the dictionary storage means comprises dictionary single-stroke storage means for storing the single stroke data as dictionary single-stroke data and the dictionary stroke data in relation to each other, during registration;

the temporary storage means comprises retrieval single-stroke storage means for temporarily storing the single-stroke data as retrieval single-stroke data, during retrieval; and the retrieval means compares the dictionary single-stroke data and the retrieval single-stroke data to select the dictionary stroke data related to the dictionary single-stroke data which best approximates the retrieval single-stroke data.

According to the invention, the single-stroke data is prepared from the stroke data input by handwriting. During registration, the dictionary single-stroke data and the dictionary stroke data are stored in relation to each other. During retrieval, the retrieval single-stroke data are stored temporarily. Also during retrieval, the dictionary and retrieval single-stroke data are compared, and the dictionary stroke data related to the dictionary single-stroke data which best approximates the retrieval single-stroke data is selected.

Thus, by preparing single-stroke data, it is possible to retrieve even in the case of cursive handwriting input. Since the retrieval is performed by comparing single-stroke data while eliminating the matching process with a character recognition dictionary, even symbols and diagrams not contained in the character recognition dictionary can be retrieved easily.

The invention is characterized in that:

the dictionary storage means further comprises dictionary stroke number storage means for storing a number of strokes of the stroke data of the predetermined character string unit as a dictionary stroke number and the dictionary stroke data in relation to each other, during registration;

the temporary storage means further comprises retrieval stroke number storage means for temporarily storing the number of strokes of the stroke data of predetermined character string unit as a retrieval stroke number, during retrieval; and the retrieval means determines an absolute value of a difference between the dictionary stroke number and the retrieval stroke number, selects the dictionary stroke data related to the dictionary stroke number for which the absolute value of the difference between the retrieval stroke number is within a predetermined threshold value, compares the dictionary transform coefficient related to the selected dictionary stroke data and the retrieval transform coefficient, and selects the dictionary stroke data related to the dictionary transform coefficient which best approximates the retrieval transform coefficient.

According to the invention, the dictionary transform coefficient and the dictionary stroke number are stored in relation to the dictionary stroke data, and the retrieval transform coefficient and the retrieval stroke number are stored temporarily. During retrieval, as mentioned above, the dictionary stroke data is selected based upon the stroke number comparison result and the transform coefficient comparison result. In this manner, the dictionary stroke data are narrowed down according to the stroke number comparison result, and the dictionary stroke data is determined according to the transform coefficient comparison result, so it is possible to efficiently execute the retrieval process. Also, the design is such that retrieval is performed by comparing the transform coefficients, and matching with the character recognition dictionary is not performed. Thus, it is possible to retrieve easily even the strokes of symbols and diagrams not contained in the character recognition dictionary.

The invention is characterized in that:

the dictionary storage means further comprises dictionary stroke number storage means for storing, a number of strokes of the stroke data of the predetermined character string unit as a dictionary stroke number and the dictionary stroke data in relation to each other, during registration;

the temporary storage means further comprises retrieval stroke number storage means for temporarily storing the number of strokes of the stroke data of predetermined character string unit as retrieval stroke number, during retrieval; and the retrieval means determines an absolute value of a difference between the dictionary stroke number and the retrieval stroke number, selects the dictionary stroke data related to the dictionary stroke number for which the absolute value of the difference between the retrieval stroke number is within a predetermined threshold value, compares the dictionary single-stroke data related to the selected dictionary stroke data and the retrieval single-stroke data, and selects the dictionary stroke data related to the dictionary single-stroke data which best approximates the retrieval single-stroke data.

According to the invention, the dictionary single-stroke data and the dictionary stroke number are stored in relation to the dictionary stroke data, and the retrieval single-stroke data and the retrieval stroke number are stored temporarily.

During retrieval, as mentioned above, the dictionary stroke data is selected based upon the stroke number comparison result and the single-stroke data comparison result. In this manner, the dictionary stroke data are narrowed down according to the stroke number comparison result, and the dictionary stroke data is determined according to the single-stroke data comparison result, so it is possible to efficiently execute the retrieval process. Also, the design is such that retrieval is performed by comparing the single-stroke data, and matching with the character recognition dictionary is not performed. Thus, it is possible to retrieve easily even the strokes of symbols and figures not contained in the character recognition dictionary.

The invention is characterized in that:

the ink bundle data preparation means further comprises pseudo-character number computation means for computing a pseudo-character number from the stroke data of the predetermined character string unit;

the dictionary storage means further comprises dictionary pseudo-character number storage means for storing the pseudo-character number as a dictionary pseudo-character number and the dictionary stroke data in relation to each other, during registration;

the temporary storage means further comprises retrieval pseudo-character number storage means for temporarily storing the pseudo-character number as a retrieval pseudo-character number, during retrieval; and the retrieval means determines an absolute value of a difference between the dictionary pseudo-character number and the retrieval pseudo-character number, selects the dictionary stroke data related to the dictionary pseudo-character number for which the absolute value of the difference between the retrieval pseudo-character number is within a predetermined threshold value, compares the dictionary transform coefficient related to the selected dictionary stroke data and the retrieval transform coefficient, and selects the dictionary stroke data related to the dictionary transform coefficient which best approximates the retrieval transform coefficient.

According to the invention, the dictionary transform coefficient and the dictionary pseudo-character number are stored in relation to the dictionary stroke data, and the retrieval transform coefficient and the retrieval pseudo-character number are stored temporarily. During retrieval, as mentioned above, the dictionary stroke data are narrowed down according to the result of the pseudo-character number comparison, and the dictionary stroke data is determined according to the transform coefficient comparison result, so it is possible to efficiently execute the retrieval process. Also, the design is such that retrieval is performed by comparing the transform coefficient, and matching with the character recognition dictionary is not performed, so it is possible to retrieve easily even the strokes of symbols and figures not contained in the character recognition dictionary.

The invention is characterized in that:

the ink bundle data preparation means further comprises pseudo-character number computation means for computing a pseudo-character number from the stroke data of the predetermined character string unit;

the dictionary storage means further comprises dictionary pseudo-character number storage means for storing the pseudo-character number as a dictionary pseudo-character number and the dictionary stroke data in relation to each other, during registration;

the temporary storage means further comprises retrieval pseudo-character number storage means for temporarily storing the pseudo-character number as a retrieval pseudo-character number, during retrieval; and the retrieval means determines an absolute value of a difference between the dictionary pseudo-character number and the retrieval pseudo-character number, selects the dictionary stroke data related to the dictionary pseudo-character number for which the absolute value of the difference between the retrieval pseudo-character number is within a predetermined threshold value, compares the dictionary single-stroke data related to the selected dictionary stroke data and the retrieval single-stroke data, and selects the dictionary stroke data related to the dictionary single-stroke data which best approximates the retrieval single-stroke data.

According to the invention, the dictionary single-stroke data and the dictionary pseudo-character number are related to the dictionary stroke data and stored, and the retrieval single-stroke data and the retrieval pseudo-character number are stored temporarily. During retrieval, as mentioned above, the dictionary stroke data are narrowed down according to the pseudo-character number comparison result, and the dictionary stroke data is determined according to the single-stroke data comparison result, so it is possible to efficiently execute the retrieval process. Also, the design is such that retrieval is performed by comparing the single-stroke data, and matching with the character recognition dictionary is not performed, so it is possible to retrieve easily even the strokes of symbols and figures not contained in the character recognition dictionary.

The invention is characterized in that:

the ink bundle data preparation means further comprises characteristic point extraction means for extracting characteristic points of the stroke data of the predetermined character string unit to prepare characteristic point stroke data, and the single-stroking means of the ink bundle data preparation means single-strokes the characteristic point stroke data, instead of the stroke data of predetermined character string unit.

According to the invention, characteristic point stroke data is prepared from the stroke data that was input by handwriting, and the single-stroke data is prepared from the characteristic point stroke data. In this manner, by extracting the characteristic points, it is possible to reduce the amount of process data and to execute an easy retrieval process, with fast processing speed and high precision.

The invention is characterized in that the handwritten character and symbol processing apparatus further comprises display means for displaying characters or symbols based on the dictionary stroke data selected by the retrieval means.

According to the invention, characters and symbols are displayed on the display, so the operator can ascertain whether or not the retrieved characters and symbols are appropriate.

The invention is characterized in that:

the handwritten character and symbol processing apparatus further comprises correct/incorrect data input means through which correct/incorrect data indicating whether or not the characters or symbols displayed on the display means are desired characters or symbols, and the dictionary storage means comprises correct/incorrect data storage means for storing the correct/incorrect data for each dictionary ink bundle data, and the retrieval means regards the dictionary ink bundle data for which the characters or symbols are indicated to be desired ones by means of the correct/incorrect data, as an object to be replaced.

According to the invention, the correct/incorrect data input by the operator who observed the character or symbol displayed on the display is stored for each dictionary ink bundle data. The dictionary ink bundle data, which is indicated by means of the correct/incorrect data that the character or symbol is the desired character or symbol, becomes the object to be replaced. Consequently, it is possible to replace only the appropriate characters or symbols with other ink bundle data.

The invention further provides a medium which stores a program for controlling a handwritten character and symbol processing apparatus by a computer, the handwritten character and symbol processing apparatus comprising input means having an input surface to which characters or symbols are input by specified indication means, wherein the program controls the computer so as to output stroke data which is a track of the indication means from the start of indication to the end of the indication on the input surface by the indication means; to prepare ink bundle data from stroke data of a predetermined character string unit among the stroke data; to store the ink bundle data as dictionary ink bundle data and the stroke data of the predetermined character string unit as dictionary stroke data in relation to each other, during registration of the stroke data; to temporarily store the ink bundle data as retrieval ink bundle data, during retrieval of the stroke data; and also to compare the dictionary ink bundle data and the retrieval ink bundle data to select the dictionary stroke data related to the dictionary ink bundle data which best approximates the retrieval ink bundle data, during retrieval.

According to the invention, it is possible to provide a medium which stores the program for executing such operations as described above, on the handwritten character and symbol processing apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other and further objects, features, and advantages of the invention will be more explicit from the following detailed description taken with reference to the drawings wherein:

FIG. 3A is a diagram showing an example of notation using approximately reformed stroke data 31, and FIG. 3B is a diagram showing the stroke data 31;

FIG. 4A is a diagram showing an example of notation using single-stroke data 35 having been subjected to the single-stroking process, and FIG. 4B is a diagram showing the single-stroke data 35;

DETAILED DESCRIPTION OF THE PREFERRED EMBODIMENTS

Figure 1A:
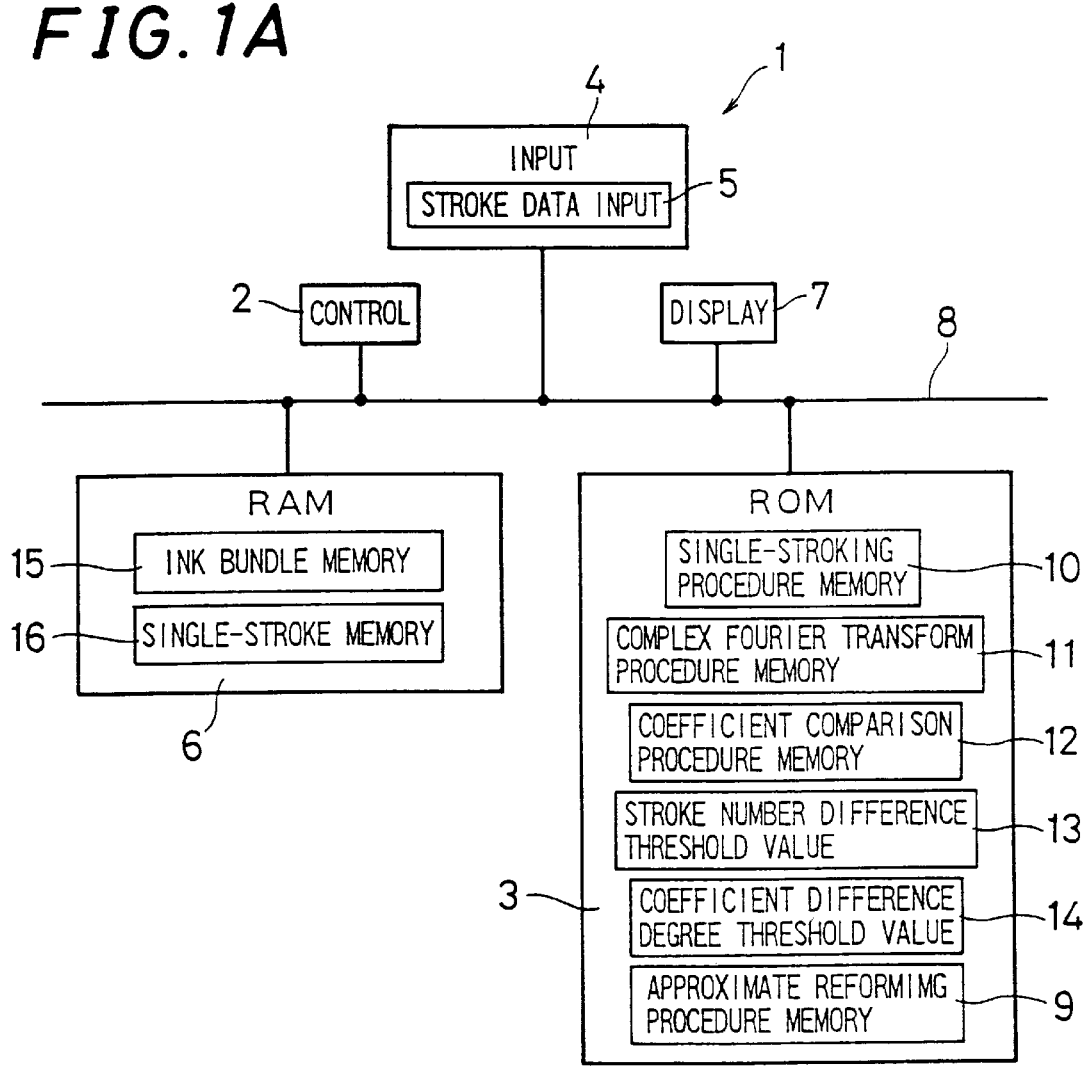
FIG. 1A is a block diagram showing an electrical structure of a handwritten character and symbol processing apparatus 1, which is a first embodiment of the present invention.

Now referring to the drawings, preferred embodiments of the invention are described below.

A handwritten character and symbol processing apparatus according to the present invention is characterized by registering stroke data obtained by inputting handwritten characters and symbols in character string units and retrieving the stroke data. To be specific, it is characterized in that the ink bundle data is prepared from the stroke data of a predetermined character string unit, from among the stroke data; during registration, the ink bundle data is regarded as dictionary ink bundle data; the stroke data of predetermined character string unit is regarded as dictionary stroke data; the dictionary ink bundle data and the dictionary stroke data are stored in a dictionary in relation to each other; during retrieval, the ink bundle data is temporarily stored as retrieval ink bundle data; furthermore, the dictionary ink bundle data and the retrieval ink bundle data are compared, and the dictionary stroke data related to the dictionary ink bundle data that best approximates the retrieval ink bundle data is selected.

That is, it is characterized in that segment data such as that of the apparatus of the prior art is not prepared, and the stroke data during handwritten input is directly handled without modification as ink bundle data.

Here, the stroke data indicates a track of an input pen from pen down, at the start of indication on an input surface by means of the input pen, to pen up, at the end of the indication. The ink bundle data, which is a group of input stroke data, is the stroke data input for each unit of the retrieval process. With a period of one unit of the retrieval process as one ink bundle, the ink bundle data can be regarded as the stroke data obtained through handwritten input during the unit period. After the determination of a time from an endpoint of a stroke to a starting point of the next stroke (i.e., a time from pen up when the input pen leaves the input surface to pen down when the input pen next contacts the input surface), the unit period can be regarded as a time from the point in time when the time exceeds a predetermined threshold time to the point in time when the threshold value is exceeded next. Or with a unit amount as one ink bundle, the ink bundle data may be regarded as a stroke data string resulting from the unit amount of handwritten input. The unit period and unit amount may be specified by the operator. Also, the segment data is the stroke data of a designated unit (e.g., one character, one radical, one word) that is cut automatically from multiple stroke data obtained through handwritten input.

Figure 1B:
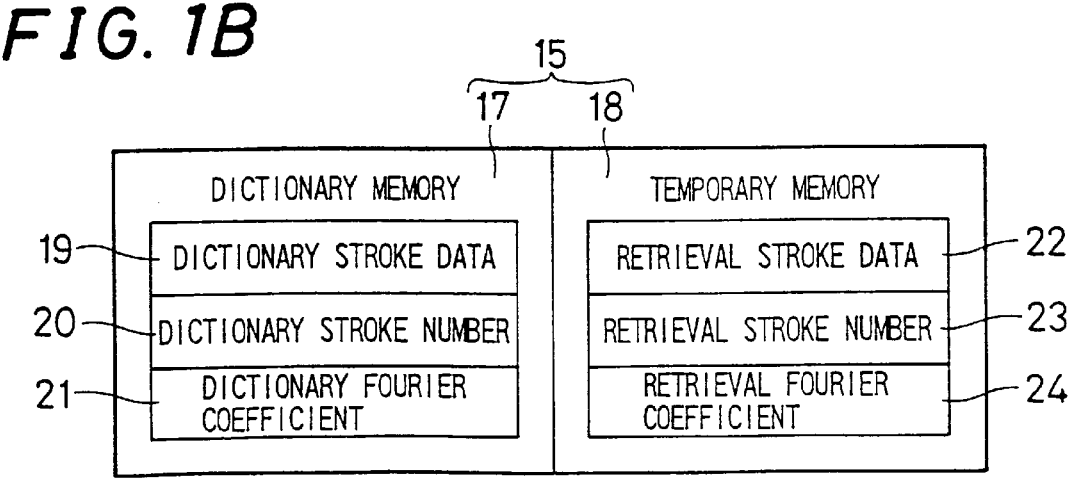
FIG. 1B is a diagram showing a structure of an ink bundle memory 15 of the handwritten character and symbol processing apparatus 1.

FIG. 1A is a block diagram showing an electrical structure of a handwritten character and symbol processing apparatus 1, which is a first embodiment of the present invention. FIG. 1B is a diagram showing a structure of an ink bundle memory block 15 of the handwritten character and symbol processing apparatus 1.

The handwritten character and symbol processing apparatus 1 of this embodiment is basically characterized by:

- single-stroking the stroke data of one ink bundle that was input through handwriting to prepare single-stroke data;
- subjecting the single-stroke data to orthogonal basis transform process to determine a transform coefficient;
- determining a number of strokes of the stroke data of one ink bundle; and
- during registration, defining the transform coefficient as a dictionary transform coefficient and the number of strokes as a dictionary stroke number, to store the dictionary transform coefficient and the dictionary stroke number in a dictionary in relation to dictionary stroke data which are the stroke data of one ink bundle, and
- during retrieval, defining the transform coefficient as a retrieval transform coefficient and the stroke number as a retrieval stroke number, to temporally store them, and then selecting the dictionary stroke data based on results of stroke number comparison and transform coefficient comparison.

The handwritten character and symbol processing apparatus 1 comprises a control part 2, a ROM (read-only memory) 3, an input part 4, a RAM (random-access memory) 6, and a display 7. These are interconnected by means of a system bus 8.

The display 7 is implemented by means of a liquid-crystal display, for example, and an input surface of a stroke data input part 5 of the input part 4 is laminated on a display screen of the display 7. The input screen has a light transmissivity, so images displayed on the display screen are visible through the input surface. On the display screen are displayed handwritten stroke data input from the stroke data input part 5 of the input part 4 as well as characters, symbols, etc., based on the dictionary stroke data of a first proposal selected by a retrieval process described later.

The input part 4 comprises the stroke data input part 5 including an input pen, etc., which is an indication device, and the input surface to which indication by means of the input pen is made. Predetermined rectangular coordinates are set on the input surface, and handwritten characters and symbols are input by indicating with the input pen on the input surface. Also, from the stroke data input part 5, an analog coordinate signal representing the stroke data that includes coordinate points pointed by the input pen is output, converted from analog to digital, and provided to the control part 2. Such a stroke data input part 5 is implemented, for example, by a tablet of resistance film-type, electromagnetic induction-type, or electrostatic induction-type, and the like.

The control part 2 is implemented by a CPU (central processing unit), for example, and it controls an operation of the whole apparatus 1. This is done to procedures stored in an approximate reforming processing procedure 9, a single-stroking processing procedure 10, a complex Fourier transform processing procedure 11, a coefficient comparison processing procedure 12, etc of the ROM 3. By this control, an approximate reforming process of the stroke data of one ink bundle, a single-stroking process, a complex Fourier transform process, and a coefficient comparison process are executed. The ROM 3 stores a stroke number difference threshold value 13 and a coefficient difference degree threshold value 14, in addition to these processes.

The RAM 6 comprises an ink bundle memory 15 which stores the stroke data from the stroke data input part 5 with one ink bundle as the unit, and has a dictionary memory 17 and a temporary memory 18; and a single-stroke memory 16.

In the dictionary memory 17 of the ink bundle memory 15 are stored dictionary stroke data 19, a dictionary stroke number 20 of the data 19, and a dictionary Fourier coefficient 21 obtained through the complex Fourier transform process for the data 19, etc. In the temporary memory 18 are stored retrieval stroke data 22 of retrieval keywords input during retrieval, a retrieval stroke number 23 of the data 22, and a retrieval Fourier coefficient 24 obtained through the complex Fourier transform process for the data 22, etc. In the single-stroke memory 16 are stored single-stroke data obtained through the single-stroking process.

Furthermore, the handwritten character and symbol processing apparatus 1 is structured so that the ink bundle data are stored in the RAM 6. However, it may be structured so that a file control device is provided and the data are read into the RAM 6 from files of the apparatus, for example.

Figure 2:
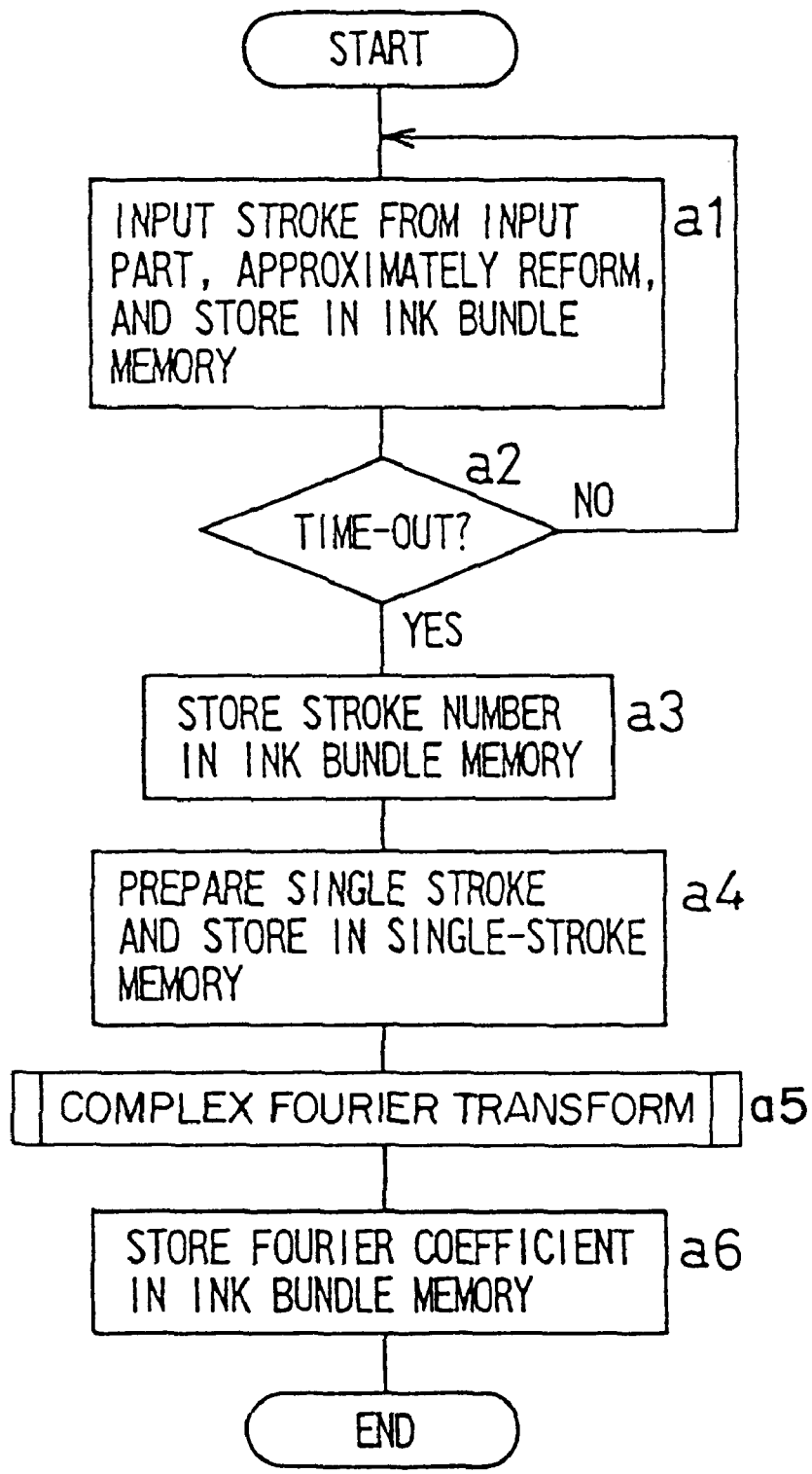
FIG. 2 is a flowchart for explaining a registration operation of the handwritten character and symbol processing apparatus 1.

The registration operation and retrieval operation of the handwritten character and symbol processing apparatus 1 will be explained next. FIG. 2 is a flowchart for explaining the registration operation of the device 1. In step a1, a handwritten character or symbol is input by indicating on the input surface with the input pen, the stroke data is output from the stroke data input part 5, and the stroke data is subjected to the approximate reforming process. Although the approximate reforming process is executable in two stages, in the present embodiment that determines a transform coefficient, the approximate reforming process may be executed for only the first stage.

The first-stage approximate reforming process, which is for displaying the input raw stroke data, smoothes by removing identical points or a point having small distance to the next point, in order to compensate the stay or shake of the input pen. The second-stage approximate reforming process is a so-called characteristic point extraction process that prepares characteristic point stroke data for DP matching from the stroke data for display, and it eliminates points other than the points of inflection or the characteristic points that form a curve. The second-stage approximate reforming process is performed because the number of points which can be given to a DP matching circuit is limited, and also performed for enabling the points to be handled regardless of the writing speed and the size during writing. In the present embodiment, such second-stage approximate reforming process can be omitted because it can be represented using a predetermined fixed number of broken lines when determining the Fourier coefficient as, which is a transform coefficient described later, even after points other than the characteristic points have been thinned out.

Figure 3A:
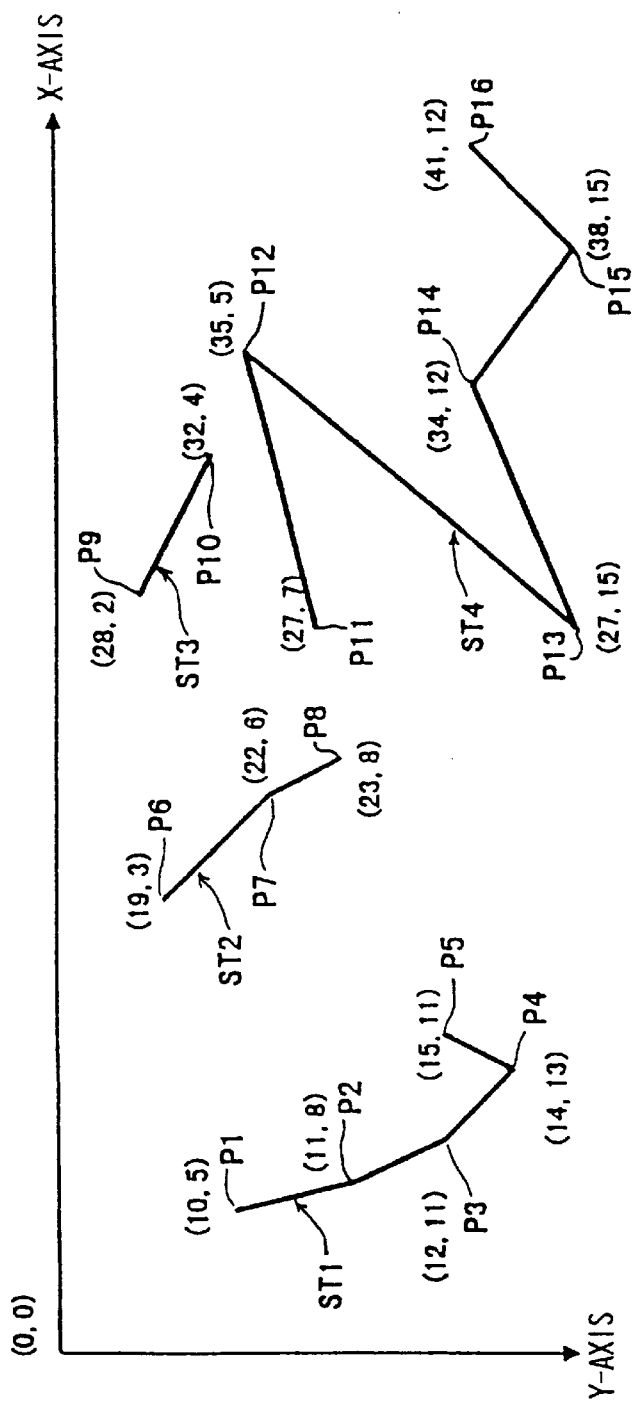
FIGS. 3A and 3B are diagrams for explaining a method of approximate reforming process.
Figure 3B:
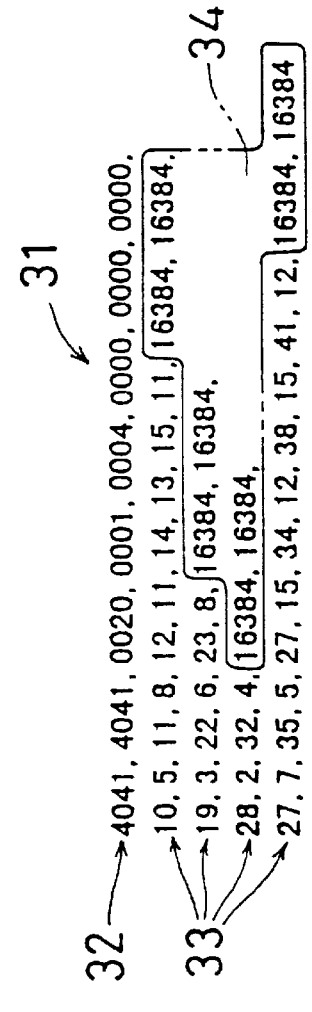

FIGS. 3A and 3B are diagrams for explaining the approximate reforming processing method. FIG. 3A shows an example of the notation using approximately reformed stroke data 31. FIG. 3B shows the stroke data 31. The stroke data 31 comprises coordinate data which represent coordinate points of the input surface on which mutually orthogonal x-y coordinates are set, or coordinate points by means of the input pen. When the coordinate points included in first to fourth strokes ST1 to ST4 are reformed approximately, coordinate points P1 to P16 are remained, and the other coordinate points are removed.

The approximately reformed stroke data 31 comprise a header 32 indicative of a data type or the like, coordinate data 33 representative of the coordinate points P1 to P16, and stroke terminus symbol data 34 indicative of terminus of each stroke ST1 to ST4. To be specific, it is formed in the following order: After the header 32, the coordinate data 33 representative of the coordinate points P1 to P5 of the first stroke ST1, the stroke terminus symbol data 34 of the first stroke ST1, the coordinate data 33 representative of the coordinate points P6 to P8 of the second stroke ST2, the stroke terminus symbol data 34 of the second stroke ST2, the coordinate data 33 representative of the coordinate points P9, P10 of the third stroke ST3, the stroke terminus symbol data 34 of the third stroke ST3, the coordinate data 33 representative of the coordinate points P11 to P16 of the fourth stroke ST4, and the stroke terminus symbol data 34 of the fourth stroke ST4 are formed. Furthermore, the number of strokes of the stroke data 31 is stored in the header 32. In the example of FIGS. 3A and 3B, the stroke number is "4".

Such approximately reformed stroke data 31 are stored as the dictionary stroke data 19 in the dictionary memory 17 of the ink bundle memory 15. Furthermore, raw stroke data not subjected to the approximate reforming may be stored as the dictionary stroke data 19.

In step a2, it is determined whether or not the measured time exceeds the unit period for specifying one ink bundle. The unit period can be set as mentioned previously. When it is determined that the time exceeds the unit period, the procedure proceeds to step a3. When it is determined that the time does not exceeds the unit period, the procedure returns to step a1. When the first through fourth strokes ST1 to ST4 of FIG. 3, for example, are input during the unit period, the stroke data for strokes ST1 to ST4 become the stroke data of one ink bundle.

In step a3, among the number of strokes stored in the header 32 of the stroke data 31, the number of strokes for one ink bundle data is stored as the dictionary stroke number 20 in the dictionary memory 17 of the ink bundles memory 15.

In step a4, the dictionary stroke data 19 stored in the dictionary memory 17 are connected in time series order, thereby forming single-stroke data 35. To be specific, the coordinate points are connected sequentially from the first coordinate point P1 of the first stroke ST1 to the stroke terminus symbol 34 for the number of strokes stored as the stroke number 20.

Figures 4A, 4B:
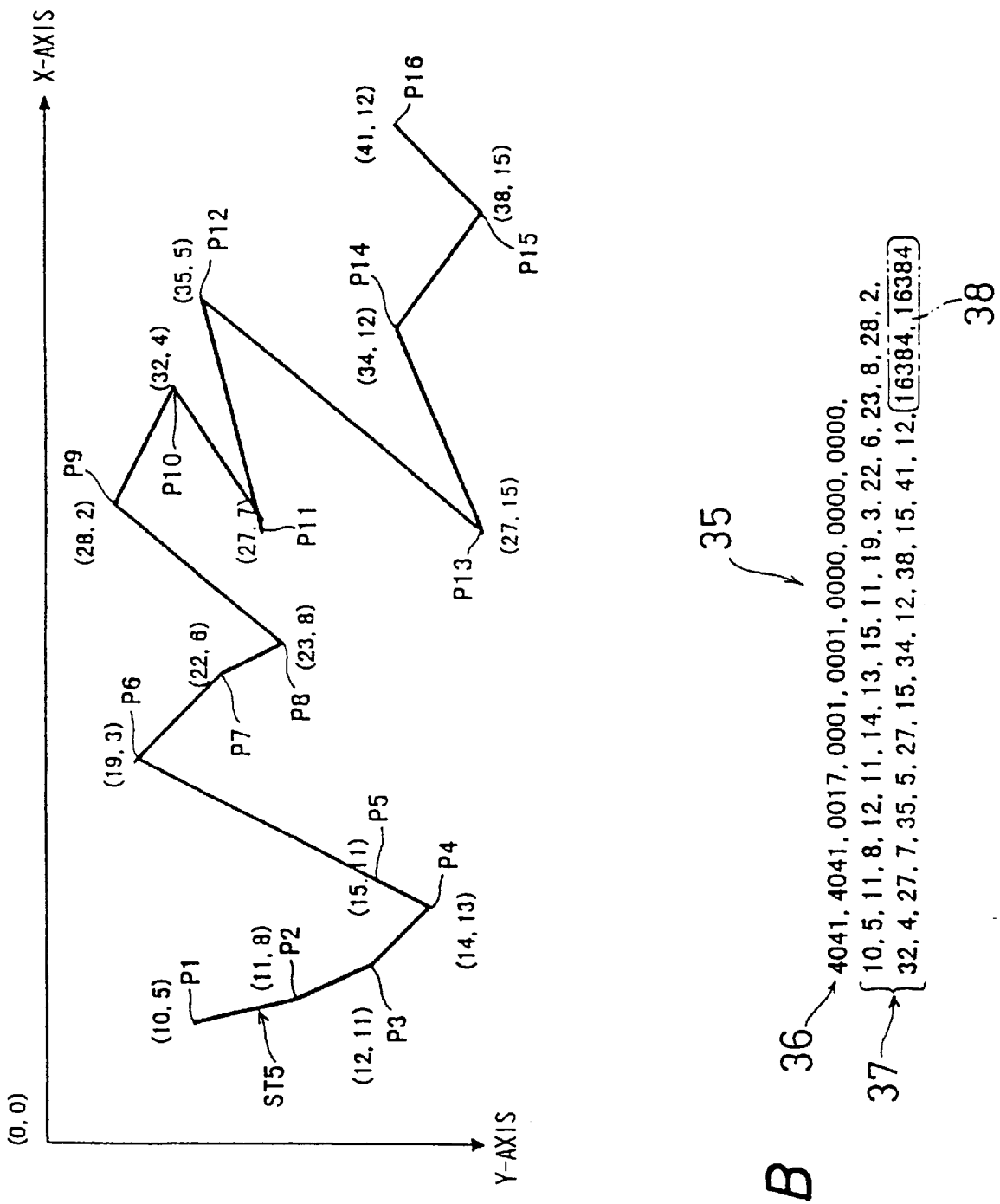
FIGS. 4A and 4B are diagrams for explaining a method of single-stroking process.

FIGS. 4A and 4B are diagrams for explaining the single-stroking processing method. FIG. 4A shows an example of the notation using the single-stroke data 35 generated by single-stroke process. FIG. 4B shows the single-stroke data 35. The single-stroked stroke data 35 comprises a header 36 indicative of a data type or the like, coordinate data 37 representative of the coordinate points P1 to P16 of a single stroke ST5 that results from the single-stroke process of the strokes ST1 to ST4, and stroke terminus symbol data 38 indicative of terminus of the stroke ST5. To be specific, following the header 32, it is sequentially formed of the coordinate data 37 representative of the coordinate points P1 to P16 and the stroke terminus symbol data 38. In the header 36, "1" is stored as the number of strokes. The stroke data 35 are stored in the single-stroke memory 16.

In step a5, an orthogonal basis transform process is performed on the single-stroked stroke data 35, and later mentioned complex Fourier transform process with the trigonometric function as the orthogonal basis is performed in the present embodiment, thereby obtaining the Fourier coefficient. In step a6, the obtained Fourier coefficient is stored as the dictionary Fourier coefficient 21 in the dictionary memory 17 of the ink bundle memory 15.

Figure 5:
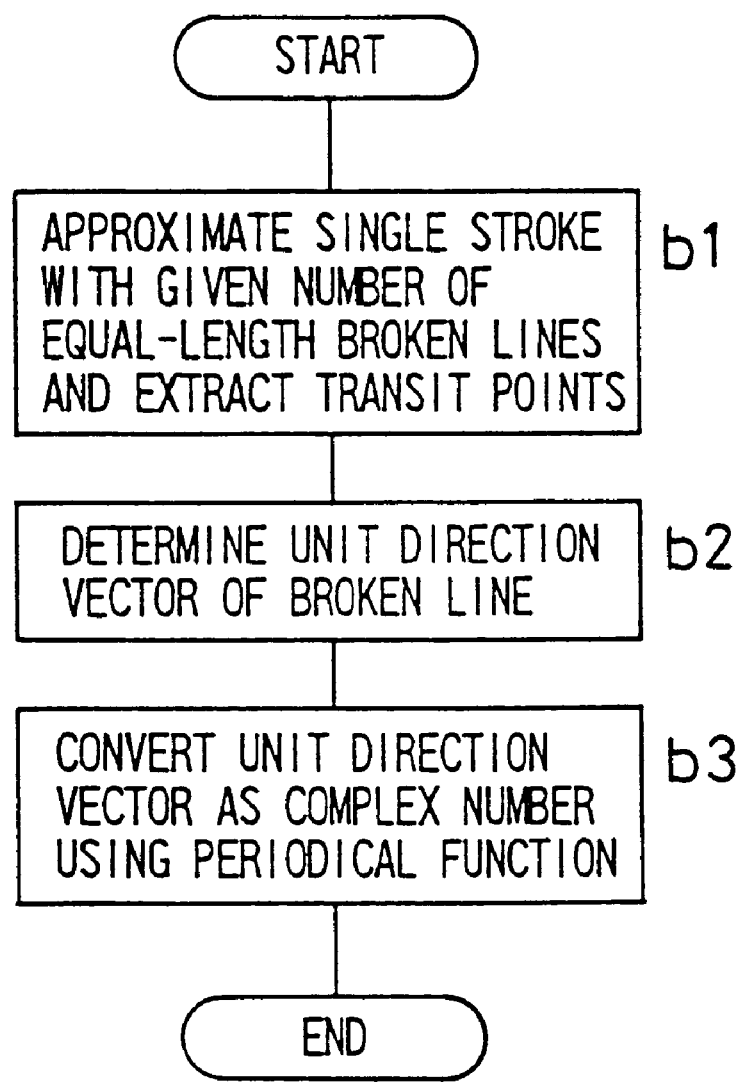
FIG. 5 is a flowchart for explaining an operation of a complex Fourier transform process.
Figure 6:
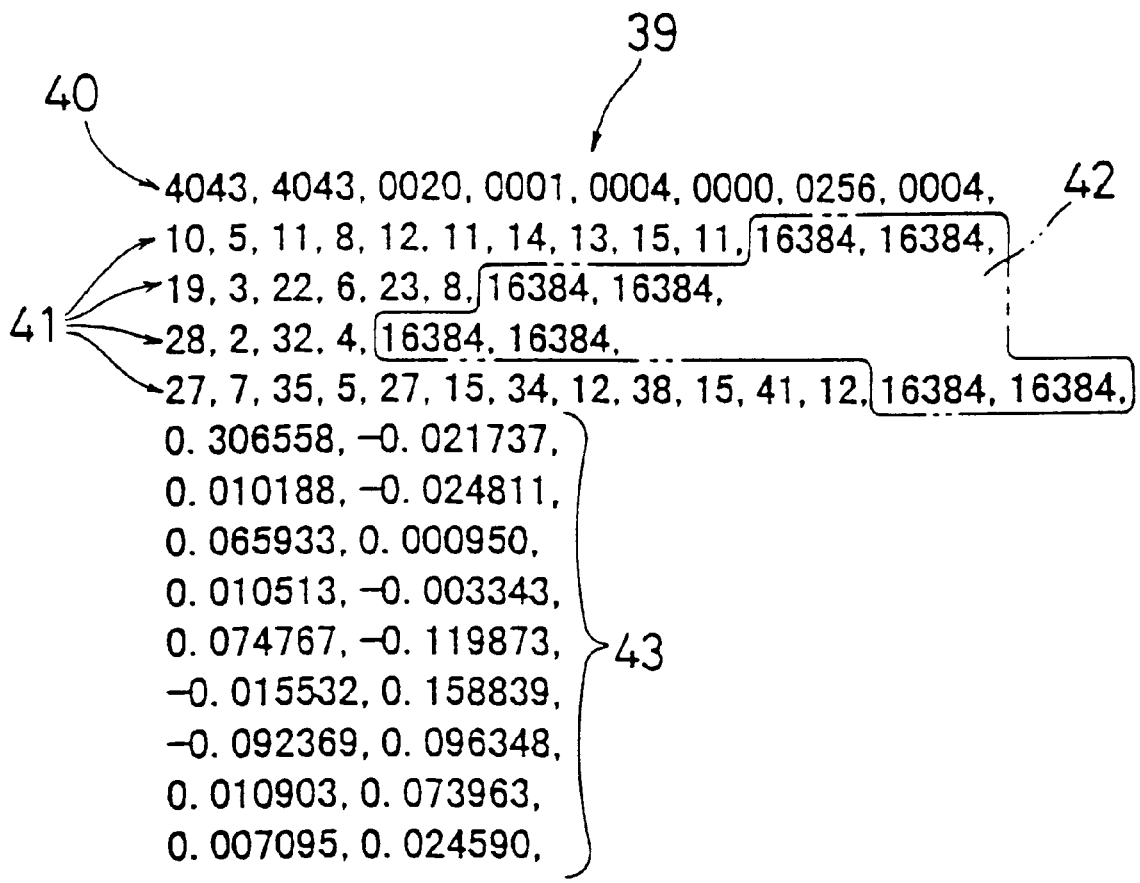
FIG. 6 is a diagram showing stroke data 39 having been subjected to the complex Fourier transform process.

Furthermore, in the present embodiment, the transform process disclosed in "New Fourier Descriptor Applicable Even in an Open Curve" by Yoshinori Uesaka (*Journal of Telecommunications Society*, 84/3, Vol. 6-A, No. 3, pp. 166–173, 1984) was adopted as the complex Fourier transform process. According to this transform process, the complex Fourier transform process is performed concretely as follows. FIG. 5 is a flowchart for explaining the operation of the complex Fourier transform process. FIG. 6 shows stroke data 39 that was subjected to the complex Fourier transform process.

In step b1, the single-stroked stroke is approximated with a specified number of broken lines of equal length, and transit points are extracted. That is, letting the length of the broken line be $\delta$, letting the number of broken lines be n, letting the x-y coordinates of the transit points of broken line be $(x(j), y(j))$, and assuming a complex plane with the x-axis as a real axis and the y-axis as an imaginary axis, the transit point is regarded as a complex number $z(j)$ on the complex plane.

$$z(j)=x(j)+iy(j) \tag{1}$$

Where n=(number of transit points of broken line)−1, j=0, 1, . . . , n, and i is an imaginary unit.

It is preferable that the number of broken lines n be a multiple of 2, e.g. 64, 128, 256, in order to perform subsequently executed transform process at high speed. Although more broken lines n result in more information obtained through the transform process, more processing time is required. Consequently, it is preferable that the number of broken lines n be determined according to the assumed single-stroke shape, and it was set at 256 in the present embodiment.

In step b2, a unit direction vector of the broken line is determined. That is, a complex number $w(j)$, which is a complex-number representation of the unit direction vector of the broken line in complex number z(j), is determined. To be specific, the complex number w(j) is given by $$w(j)=(z(j+1)-z(j))/\delta \qquad (2)$$

and it is called "P representation." A function c(k) determined from the P representation is expressed as $$c(k) = 1/n \sum_{j=0}^{j=n-1} w(j)\exp(-2\pi i jk/n) \qquad (3)$$

and it is called a discrete Fourier transform of w. Where k=0, ..., n−1. If this equation (3) is solved for w, it becomes $$w(j) = \sum_{k=0}^{k=n-1} c(k)\exp(2\pi i jk/n) \qquad (4)$$

In step b3, the unit direction vector as a complex value is transformed by using a periodical function to determine the Fourier coefficient. To be specific, the vector function of the function c(k) is expressed as C(k), and when the following equations are used for the function C(k)

$$C(k)=c(k) \text{ (where } k=0, 1, \ldots, n/2)$$

$$C(k)=c(n+k) \text{ (where } k=-n/2+1, \ldots, -1) \qquad (5)$$

The equation (4) becomes as follows through the variable transform:

$$w(j) = \sum_{k=-n/2+1}^{k=n/2} C(k)\exp(2\pi i jk/n) \qquad (6)$$

Letting C(k) in which |k|>N, be 0, the $w_N(j)$ obtained from equation (4) is called an Nth P representation.

$$w_N(j) = \sum_{k=-N}^{k=N} C(k)\exp(2\pi i jk/n) \qquad (7)$$

The function $z_N(j)$ obtained using this in equation (2) is called an Nth regeneration curve.

$$z_N(j) = z_N(0) + \delta \sum_{r=1}^{r=j-1} w_N(r) \qquad (8)$$

Where, $z_N(0)=z(0)$. The Nth degree regeneration curve $c_N$ is described using 2N+1 low-range components of the coefficient c, and it becomes an approximate curve representative of a rough shape.

If the degree N of the regeneration curve is too small, difference in shape cannot be reproduced. On the other hand, if it is too large, attention will be focused on details. Consequently, it is preferable to set the optimal degree N taking these into consideration, so it was set to 4 in the present embodiment.

As shown in FIG. 6, through such complex Fourier transform process, stroke data 39 is prepared which comprises a Fourier coefficient 43 in addition to a header 40, coordinate data 41, and stroke terminus symbol data 42, as in the stroke data 31, 35 mentioned previously.

Figure 7:
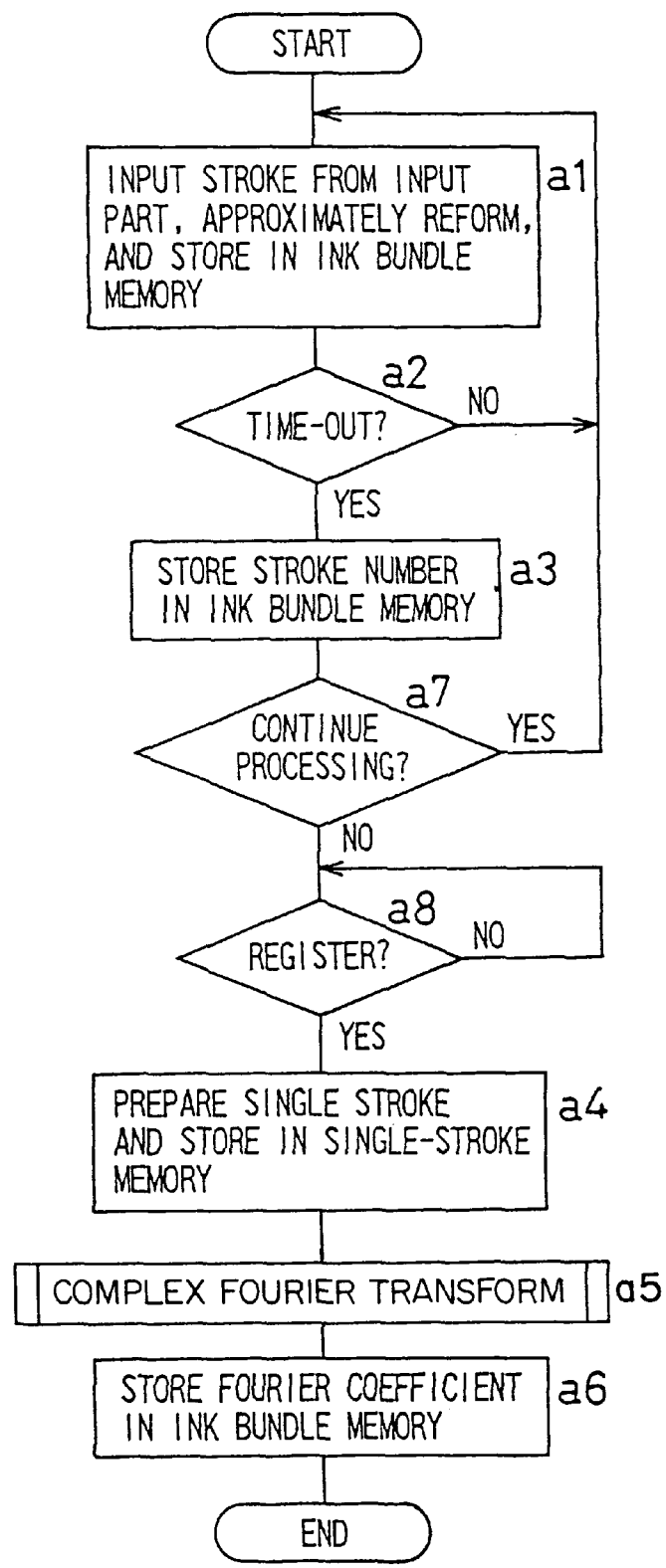
FIG. 7 is a flowchart for explaining an operation of other registration process of the handwritten character and symbol processing apparatus 1.

FIG. 7 is a flowchart for explaining an operation of the other registration process. The registration operation of FIG. 2 processes ink bundle data one at a time. By contrast, the registration operation of FIG. 7 continuously processes multiple ink bundle data. The flowchart is created by adding steps a7 and a8 to the flowchart of FIG. 2, so the explanations of common steps are omitted.

In step a7, in which the process of step a3 has been completed, it is determined whether or not to continue the process for the next ink bundle data. For example, it may be set so that the process starting at step a4 is performed only after the operator has been instructed for registration, and the determination may be based upon the facts that, after the time-out at step a2, there is no registration instruction and handwriting is input continuously. Also, for the device 1, a continuous input mode and an individual input mode may be made executable, and the determination may be made based upon the fact that the former mode was set. When it is determined that the next ink bundle data will be processed, the procedure returns to step a1. If it is determined not to process, the procedure proceeds to step a8, and if it is determined to register at step a8, the process starting at step a4 mentioned previously will be executed.

Figure 8:
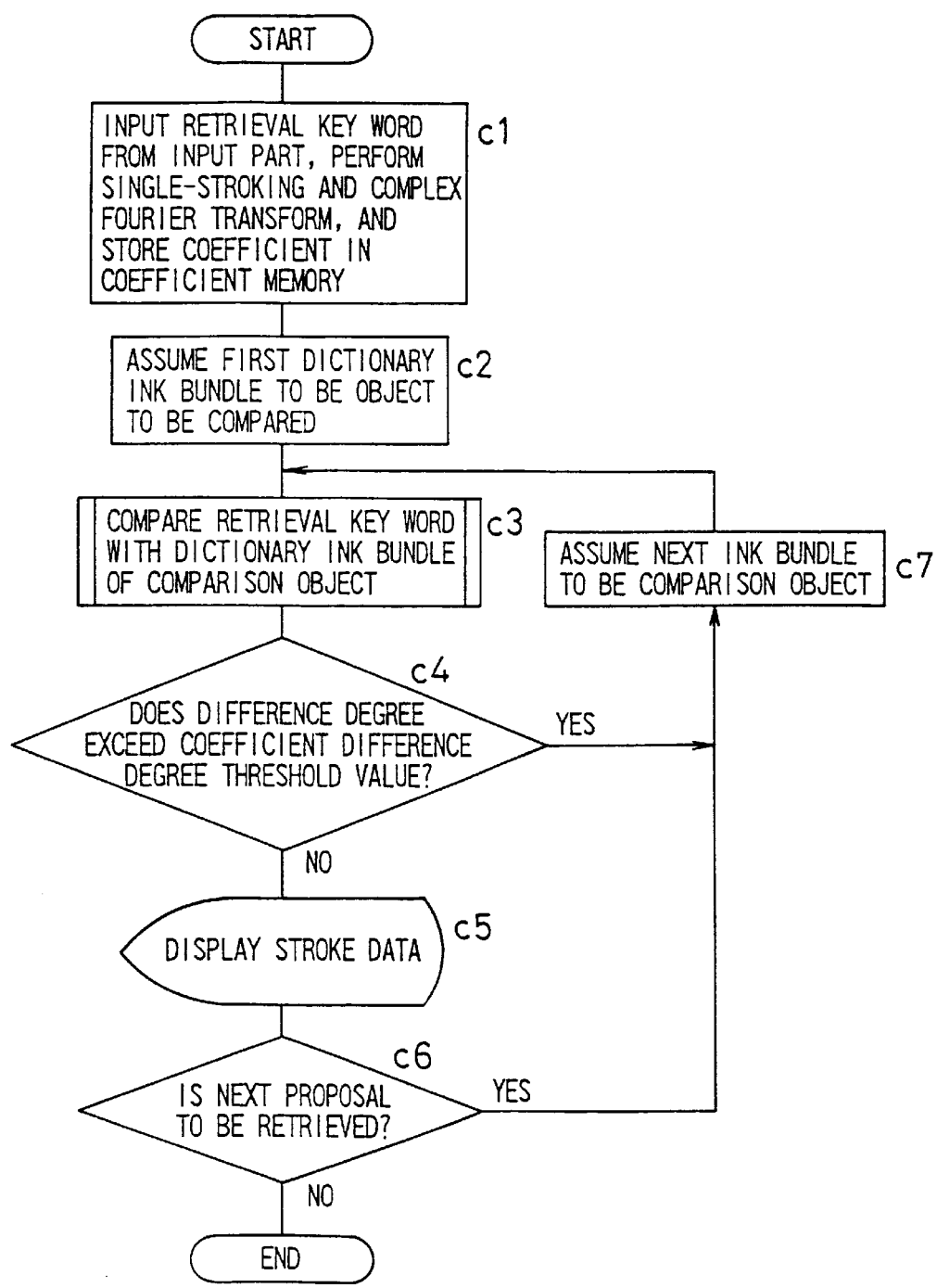
FIG. 8 is a flowchart for explaining an operation of a retrieval process of the handwritten character and symbol processing apparatus 1.

FIG. 8 is a flowchart for explaining an operation of a retrieval process. The operation of the retrieval process of the handwritten character and symbol processing apparatus 1 is that for retrieving desired data from the data registered by the registration process described above. Here, a retrieval keyword is used for retrieval, and the retrieval keyword may be input newly during retrieval or the retrieval keyword may be selected from data already registered. In the present embodiment, an example of a new input will be explained.

In step c1, the retrieval keyword is input by handwriting. As a result, the stroke data is output from the stroke data input part 5, and the stroke data is processed as in steps a1 to a6. Then, the stroke data of one ink bundle data are stored as the retrieval stroke data 22 of the temporary memory 18 of the ink bundle memory 15. And a number of strokes of the stroke data is stored as the retrieval stroke number 23 of the temporary memory 18 of the ink bundle memory 15. The retrieval stroke data 22 are connected in time series order to prepare single-stroke data. The single-stroke data is subjected to the complex Fourier transform process so as to obtain a Fourier coefficient. The Fourier coefficient is stored as the retrieval Fourier coefficient 24 in the temporary memory 18 of the ink bundle memory 15.

In step c2, an nth dictionary ink bundle is set as an object to be compared. In step c3, the retrieval keyword, which was input in step c1, and the dictionary ink bundle, which was set as the object to be compared in step c2, are compared in a manner as described later. Here, the dictionary stroke number 20, retrieval stroke number 23, dictionary Fourier coefficient 21, and retrieval Fourier coefficients 24 are used. Then, a difference degree of the nth dictionary ink bundle with respect to the retrieval keyword is determined in a predetermined manner.

In step c4, it is determined whether or not the difference degree determined in the step c3 exceeds the coefficient difference degree threshold value 14 stored in the ROM 3. If it exceeds the threshold value 14, the procedure proceeds to step c7. If not, the procedure proceeds to step c5. In step c5, a character or symbol based upon the stroke data 19 of the nth dictionary ink bundle is displayed on the display 7.

In step c6, it is determined whether or not to retrieve an (n+1)th dictionary ink bundle. If it is determined to retrieve, the procedure proceeds to step c7. If it is determined not to retrieve, the retrieval process is terminated. In step c7, the procedure returns to step c3, with the (n+1)th dictionary ink bundle as the to be compared.

Moreover, in present embodiment, whether or not to retrieve the next dictionary ink bundle is determined each time a character or figure based on the stroke data 19 of the selected dictionary ink bundle is displayed on the display 7. However, the number of data to be displayed may be determined in advance, and whether or not exactly this number is displayed may be determined.

Figure 9:
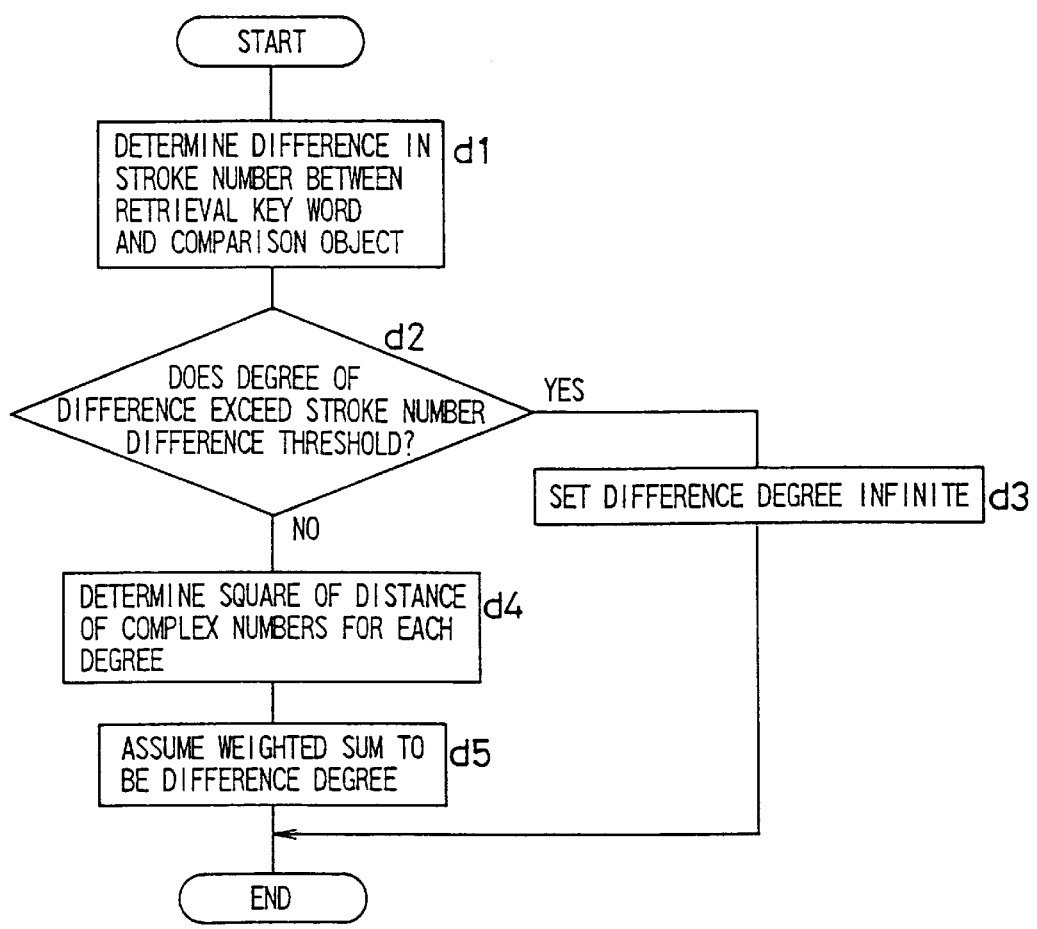
FIG. 9 is a flowchart for explaining in detail a comparison operation of step 3c in the retrieval process.

FIG. 9 is a flowchart for explaining in detail the comparison operation of step c3. In step d1, the absolute value of a difference between the dictionary stroke number 20 and the retrieval stroke number 23 is determined. In step d2, it is determined whether or not the absolute value of the difference between the stroke numbers obtained in step d1 exceeds the stroke number difference threshold value 13 stored in the ROM 3. If it exceeds the threshold value 13, the procedure proceeds to step d3. If it does not exceed the value, the procedure proceeds to step d4. In step d3, the difference degree is set to infinite, and the comparison process is terminated.

In step d4, a square of the distance between the dictionary Fourier coefficient 21 and the retrieval Fourier coefficient 24 is determined for each degree component. In step d5, the squares of the distance for each degree component of the coefficient determined in step d4 are added to each other so that they are weighted in a manner that the lower degree coefficients becomes heavier than higher degree coefficients, thereby determining difference degree is determined. The weighting may be, for example, 25 for the 0th-degree component, 16 for the 1st-degree component, 9 for the 2nd-degree component, 4 for the 3rd-degree component, and 1 for the 4th-degree component. By weighting so that the low-degree coefficients are heavy, it is possible to further increase the difference degree when the shape difference is large, compared with the case in which they were added without weighting, and it is possible to distinguish the shape difference with accuracy.

As mentioned previously, according to the first embodiment, the stroke data 31 is prepared by subjecting the stroke data from the stroke data input part 5 to the approximate reforming process. The stroke data 35 is prepared by subjecting the stroke data 31 to the single-stroking process. By subjecting the stroke data 35 to the complex Fourier transform process, the Fourier coefficient 43 is obtained and the number of strokes is obtained. During registration, the dictionary stroke data 19, the dictionary stroke number 20, and the dictionary Fourier coefficient 21 are stored in the dictionary memory 17 in relation to each other. During retrieval, the retrieval stroke data 22, the retrieval stroke number 23, and the retrieval Fourier coefficient 24 are stored temporarily in the temporary memory 18. Also during retrieval, the dictionary stroke data 19 is narrowed down according to the result of the comparison of the dictionary and retrieval stroke numbers 20, 23, and the dictionary stroke data 19 is determined according to the comparison result of the dictionary and retrieval Fourier coefficients 21, 24.

Thus, because the data are processed in character string units, the process of cutting out the input stroke data for segment units, e.g. 1 character or radical, is not now needed. As a result, the computation time required for the cutting process becomes unnecessary. Also, it becomes unnecessary for the operator to successively check the results of the cutting process and to correct when the result is inappropriate. Furthermore, because the comparison is performed in character string units during retrieval, the amount of data in one unit increases compared with the comparison in segment units, and the amount of data to be compared decreases.

Therefore, it is possible to perform the retrieval process at high speed. Also, by avoiding the cutting process, the drop in retrieval accuracy as the result of inappropriate cutting is eliminated, so it is possible to obtain stable retrieval results. Also, the operator's train of thought is not interrupted, so it is possible to input by handwriting without interrupting the characters. By processing in character string units, it is possible to retrieve the character string with a shape that resembles the entire character string, regardless of the shape of details.

By preparing the single-stroke data 35, it is possible to retrieve even when cursive handwritten characters are input. Because the retrieval process is performed by comparison of the Fourier coefficients 43 without a matching process using a character dictionary, it is possible to retrieve even symbols and figures not stored in the character recognition dictionary. Also, by using the number of strokes and the Fourier coefficient, it is possible to efficiently perform the retrieval process.

Also, because the retrieved characters and symbols are displayed on the display 7, the operator can ascertain whether or not the retrieved characters and symbols are appropriate.

In the first embodiment, in order to reduce the time required for the retrieval process precedently, the Fourier coefficient is determined during registration and stored in the dictionary memory 17 of the ink bundle memory 15. However, if the reduction of storage capacity is considered to be precedent in practice, the amount of data stored in the dictionary memory 17 may be reduced by performing the single-stroking process and the complex Fourier transform process during retrieval. In this case, however, the process speed decreases.

Also, in the first embodiment, a complex Fourier transform process with a trigonometric function basis was explained as the orthogonal basis transform process. However, examples of transform using other known basis functions also are within the scope of the present invention. For example, an Walsh-Hadamard transform, with the Walsh function as the basis, may be used. In this case a Walsh function, which uses only the values +1 and −1, is used, so it is possible to process using only addition and subtraction, without requiring multiplication or division. Therefore, it is possible to process even with small equipment, e.g. an electronic notebook, that lacks a hardware for multiplication and division.

In the first embodiment, during retrieval the dictionary stroke data 19 are narrowed down according to the stroke number comparison result, and the dictionary stroke data 19 are determined according to the Fourier coefficient comparison result. However, the following example also is within the scope of the present invention: During registration, the dictionary stroke data 19, and the dictionary pseudo-character number and the dictionary Fourier coefficient 21 are stored in the dictionary memory 17 in relation to each other; during retrieval, the retrieval stroke data 22, and the retrieval pseudo-character number and the retrieval Fourier coefficient 24 are stored temporarily in the temporary memory 18; also during retrieval, the dictionary stroke data are narrowed down according to the result of the comparison of the pseudo-character number; and the dictionary stroke data is determined according to the result of Fourier coefficient comparison. The pseudo-character number can be determined as in a second embodiment discussed later.

Figure 10A:
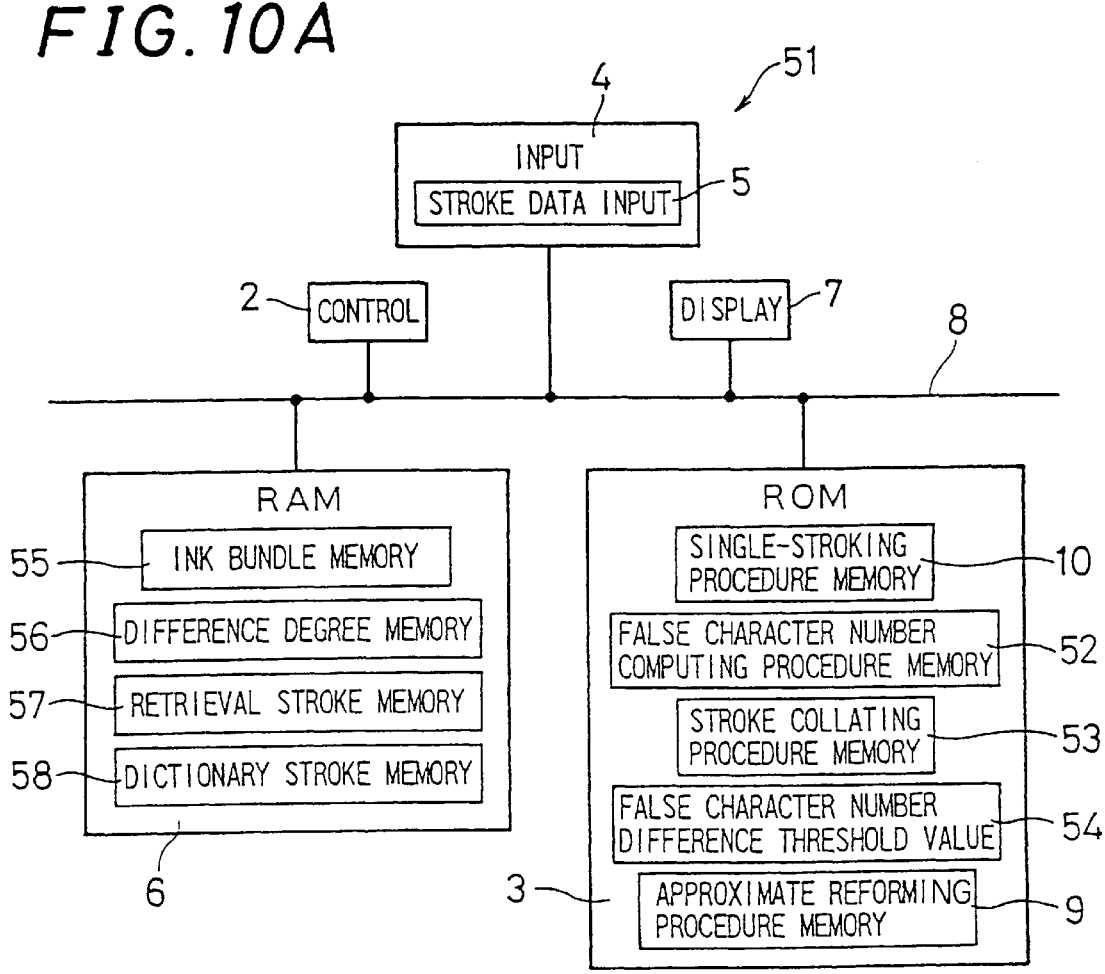
FIG. 10A is a block diagram showing an electrical structure of a handwritten character and symbol processing apparatus 51, which is a second embodiment of the present invention.
Figure 10B:
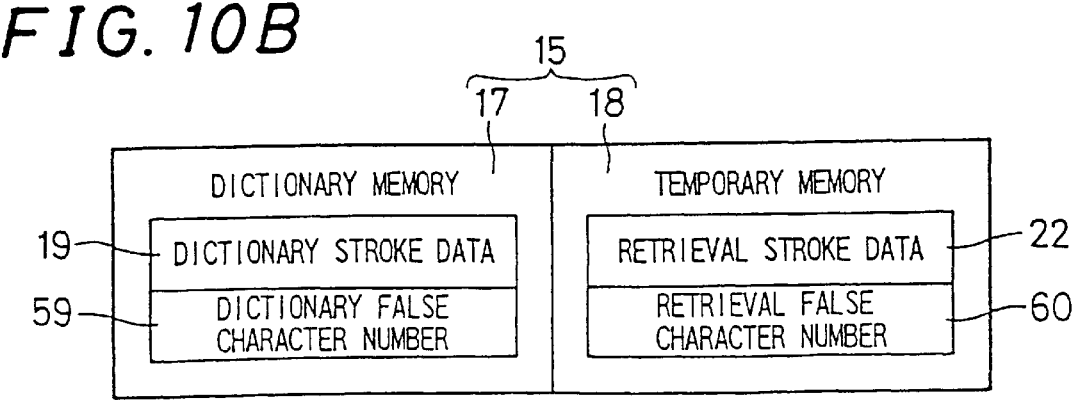
FIG. 10B is a diagram showing a structure of an ink bundle memory 55 of the handwritten character and symbol processing apparatus 51.

FIG. 10A is a block diagram showing an electrical structure of a handwritten character and symbol processing apparatus 51, which is the second embodiment of the present invention. FIG. 10B is a diagram showing a structure of an ink bundle memory 55 of the handwritten character and symbol processing apparatus 51.

The handwritten character and symbol processing apparatus 51 of the present embodiment is characterized basically in that: single-stroke data is prepared and a pseudo-character number is computed from the stroke data of one ink bundle that was input by handwriting; during registration, dictionary single-stroke data and dictionary pseudo-character number are related to dictionary stroke data and stored in a dictionary; during retrieval, retrieval single-stroke data and retrieval pseudo-character number are stored temporarily; and also during retrieval, the dictionary stroke data is selected based upon a result of comparison of the dictionary pseudo-character number and the retrieval pseudo-character number as well as a result of the comparison of the dictionary single-stroke data and the retrieval single-stroke data.

The handwritten character and symbol processing apparatus 51 is configured almost the same as the handwritten character and symbol processing apparatus 1, and includes the control part 2, the ROM 3, the input part 4, the RAM 6, and the display 7, which are connected to each other by the system bus 8. The same reference numerals are attached to the same structural elements, so the explanations thereof are omitted.

The ROM 3 comprises a pseudo-character number computing processing procedure 52 and a stroke collating processing procedure 53, in addition to the previously mentioned approximate reforming processing procedure 9 and the single-stroking processing procedure 10. The control part 2 controls the operation of the overall device 51 according to the processes stored in these memories. As a result, the approximate reforming process of the stroke data, the single-stroking process, the pseudo-character number computing process, and a stroke collating process are performed. The ROM 3 also stores a pseudo-character number difference threshold value 54, in addition to the above mentioned processes.

The RAM 6 stores the stroke data from the stroke data input part 5, with one ink bundle as a unit. The RAM 6 comprises an ink bundle memory 55 having the dictionary memory 17 and the temporary memory 18 like the ink bundle memory 15, a difference degree memory 56, a retrieval stroke memory 57, and a dictionary stroke memory 58. In the dictionary memory 17 of the ink bundle memory 55, a dictionary pseudo-character number 59 in one ink bundle or the like is stored in addition to the previously mentioned dictionary stroke data 19. In the temporary memory 18 used during the retrieval, a dictionary pseudo-character number 60 in one ink bundle or the like is stored in addition to the above mentioned dictionary stroke data 22.

As in the case of device 1, for example, also the handwritten character and symbol processing apparatus 51 may be provided with a file control device and read the ink bundle data from a file of the file control device into the RAM 6.

Figure 11:
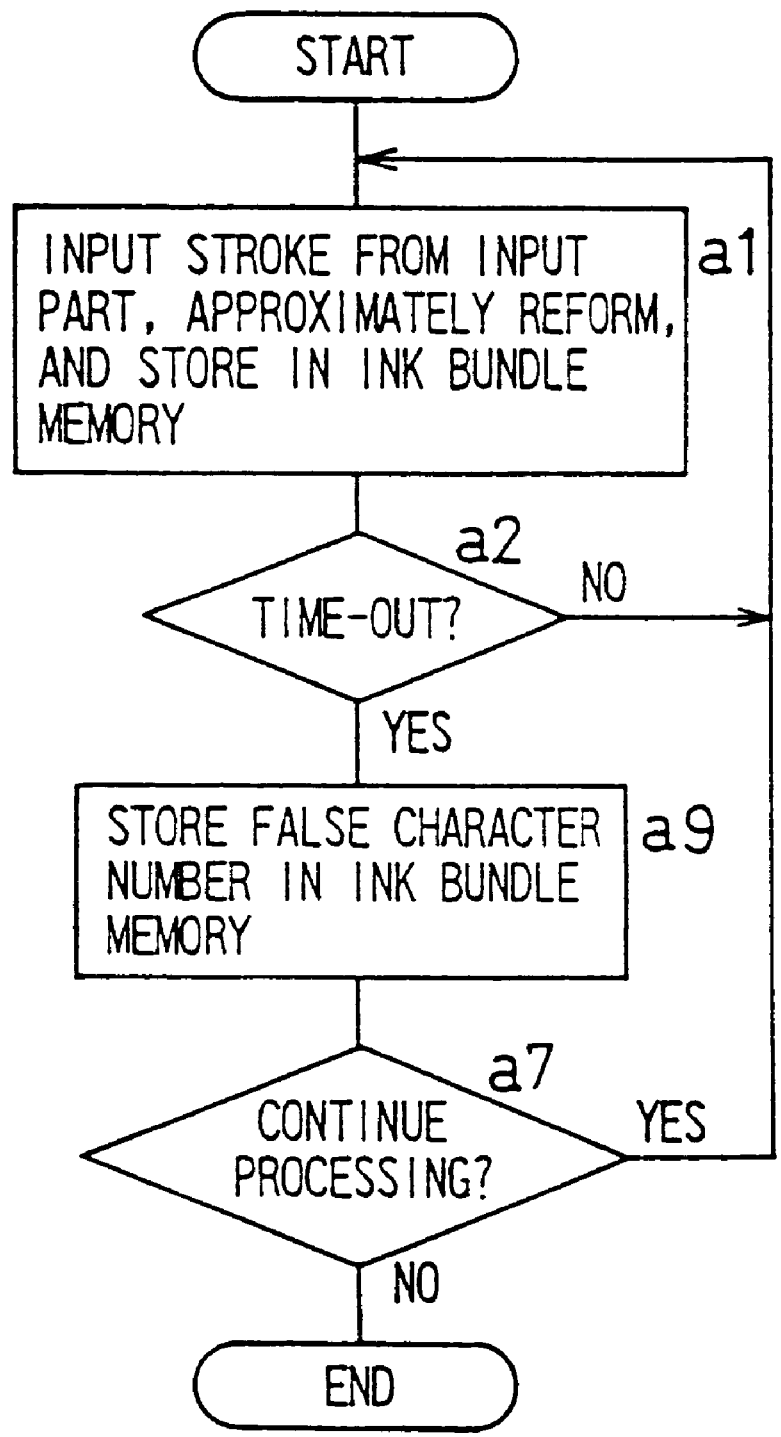
FIG. 11 is a flowchart for explaining a registration operation of the handwritten character and symbol processing apparatus 51.

FIG. 11 is a flowchart for explaining a registration operation of the handwritten character and symbol processing apparatus 51. The flowchart was created by adding step a9 to steps a1, a2, and a7 of FIG. 7. In step a1, as in the first embodiment, the stroke data output from the stroke data input part 5 is subjected to the approximate reforming process. The approximately reformed stroke data is stored as the dictionary stroke data 19 in the dictionary memory 17 of the ink bundle memory 55. Since the present embodiment does not use the transform coefficient as in the first embodiment, the approximate reforming process is performed in two stages. By extracting the characteristics points from the stroke data input by handwriting, it is possible to decrease the amount of process data, and it is possible to perform an easy retrieval process with high accuracy and high processing speed.

In step a2, it is determined whether or not the measured time exceeds the unit period for specifying one ink bundle. The unit period is set as in the first embodiment. If it is determined that it exceeds the unit period, the procedure proceeds to step a9. If it is determined that it does not exceed the unit period, the procedure returns to step a1.

In step a9, after the stroke data of one ink bundle is single-stroked, the pseudo-character number, which is determined in the manner as described later, is stored as the dictionary pseudo-character number 59 in the dictionary memory 17 of the ink bundle memory 55.

In step a7, where the process of step a9 is terminated, it is determined whether or not to continue the process with the next ink bundle data. This determination is made as in the first embodiment. If it is determined to process the next ink bundle data, the procedure returns to step a1. If it is determined not to process it, the registration process is terminated.

With such an operation, it is possible to process continuously the ink bundle data. However, as explained in the first embodiment, the ink bundle data may be processed one by one.

Figure 12:
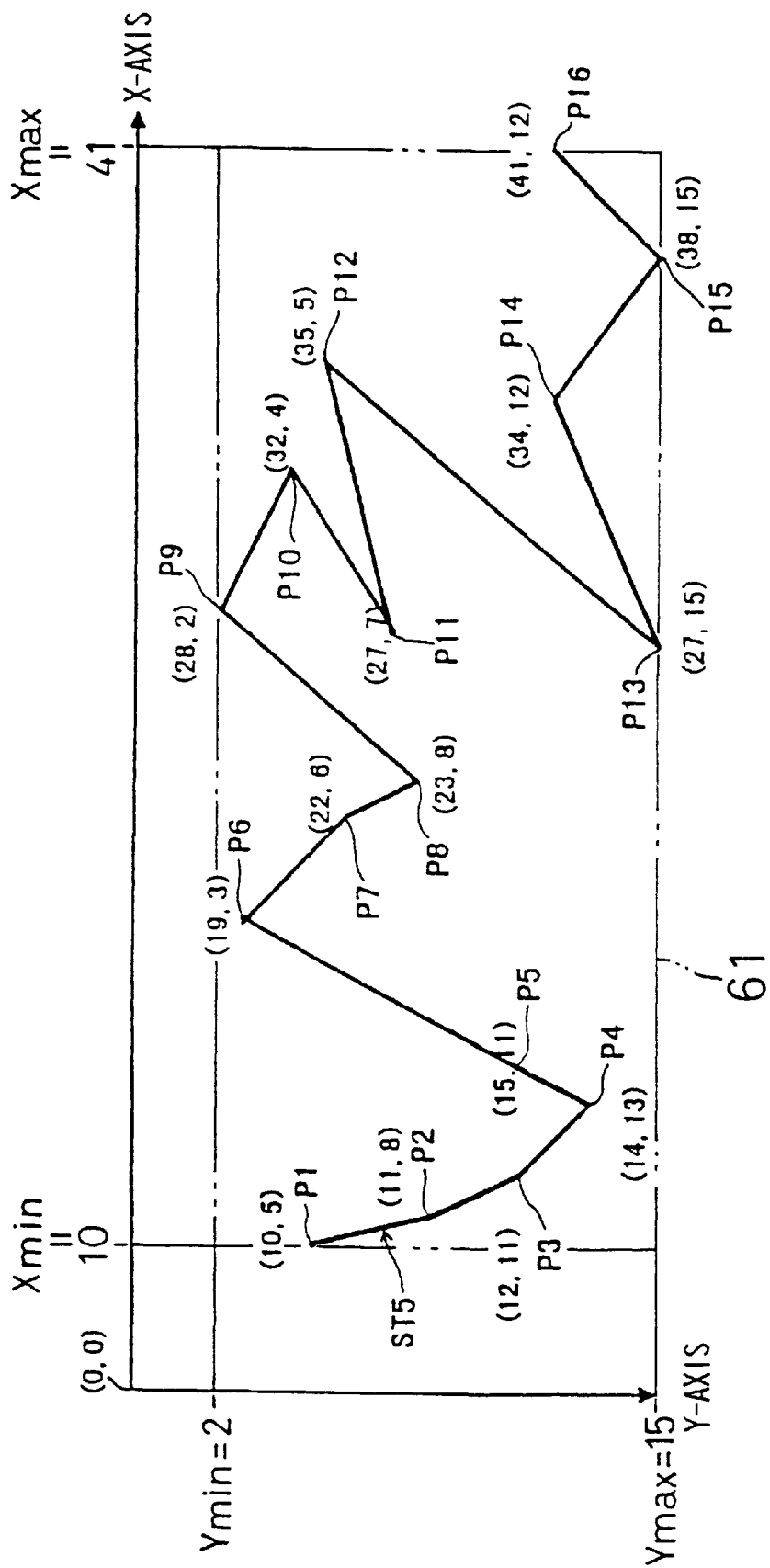
FIG. 12 is a diagram for explaining a method for computing a number of approximate characters, and it is a diagram showing an example of notation using the single-stroke data.

FIG. 12, which is a diagram for explaining a method for computing the pseudo-character number, shows an example of the notation based on the single-stroke data. Taking into consideration a minimum circumscribed rectangle 61 that encloses the single-stroke ST5, maximum and minimum coordinate points xmax, xmin, ymax, ymin on the x-axis and y-axis of the circumscribed rectangle are obtained. The pseudo-character number m is determined by using the following equation:

$$m=(x\max-x\min)/(y\max-y\min)$$

Furthermore, the numbers of decimal places are rounded off for or example, and m is represented by a whole number. Also, in the case where m is less than 1, e.g. in the case of a character that extends in the x-axis direction in one stroke such as a Chinese number − and of a character string that extends in the y-axis direction, m to set to 1. In the example of FIG. 12, the pseudo-character number becomes 2.

Figure 13:
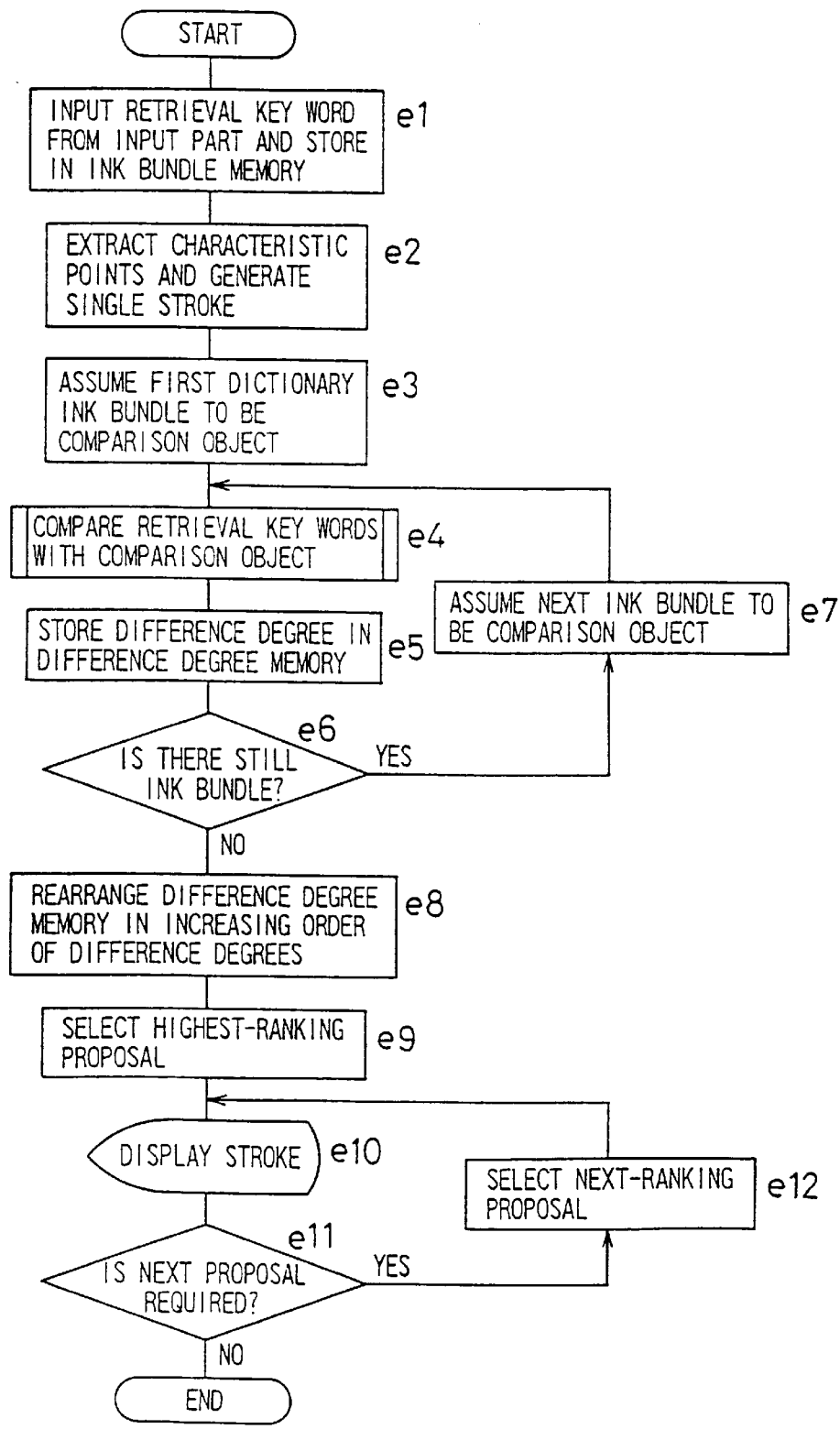
FIG. 13 is a flowchart for explaining an operation of a retrieval process of the handwritten character and symbol processing apparatus 51.

FIG. 13 is a flowchart for explaining the operation of the retrieval process of the handwritten character and symbol processing apparatus 51. In the retrieval processing operation of the device 51, also, a retrieval keyword is used. The retrieval keyword may be newly entered during retrieval or it may be selected from among the previously registered data. In the present embodiment, also, an example of new input will be explained.

In step e1, a retrieval keyword is input by handwriting, and the stroke data is output from the stroke data input part 5. Then, from among the stroke data, the stroke data of one ink bundle are stored as the retrieval stroke data 22 in the temporary memory 18 of the ink bundle memory 55.

In step e2, the retrieval stroke data 22 are subjected to the approximate reforming process. Single stroke data is prepared, the pseudo-character number is obtained from the single-stroked stroke data, and the obtained pseudo-character number is stored as a retrieval pseudo-character number 60 in the temporary memory 18 of the ink bundle memory 55. The single-stroke data is stored in the retrieval stroke memory 57 of the RAM 6.

In step e3, the nth dictionary ink bundle is set to the object to be compared. In step e4, the retrieval keyword input in step e1 and the dictionary ink bundle set as the object in step e3 are compared as discussed later, and a difference degree of the dictionary ink bundle with respect to the retrieval keyword is determined using a predetermined method. Used here are the dictionary and retrieval pseudo-character numbers 59, 60 as well as the data stored in the retrieval stroke memory 57 and the dictionary stroke memory 58.

In step e5, the difference degree determined in step e4 is stored in the difference degree memory 56 of the RAM 6. Here, difference degree is stored with being related to a dictionary ink bundle. In step e6, it is determined whether or not the difference degrees for all dictionary ink bundles have been obtained. That is, it is determined whether or not there still is a dictionary ink bundle. If it is determined there is a dictionary ink bundle remaining, the procedure proceeds to step e7. If it is determined that none remains, the procedure proceeds to step e8. In step e7, the procedure returns to step e4, with the (n+1)th dictionary ink bundle as the object to be compared.

In step e8, difference degrees stored in the difference degree memory 56 is rearranged according to the size of the value. In step e9, the dictionary ink bundle related to the highest-rank difference degree is selected at a first proposal. In step e10, a character or symbol based on the dictionary stroke data 19 of the dictionary bundle of the selected first proposal is displayed on the display 7.

In step e11, it is determined whether or not to display the dictionary ink bundle of next rank, based upon the determination of the operator as to whether or not the displayed character or symbol is appropriate. If it is determined to display the ink bundle of the next rank, the procedure proceeds to step e12. If it is determined not to display, the retrieval process is terminated. In step e12, the dictionary ink bundle related to the difference degree of next rank is selected, and the procedure returns to step e10.

Figure 14:
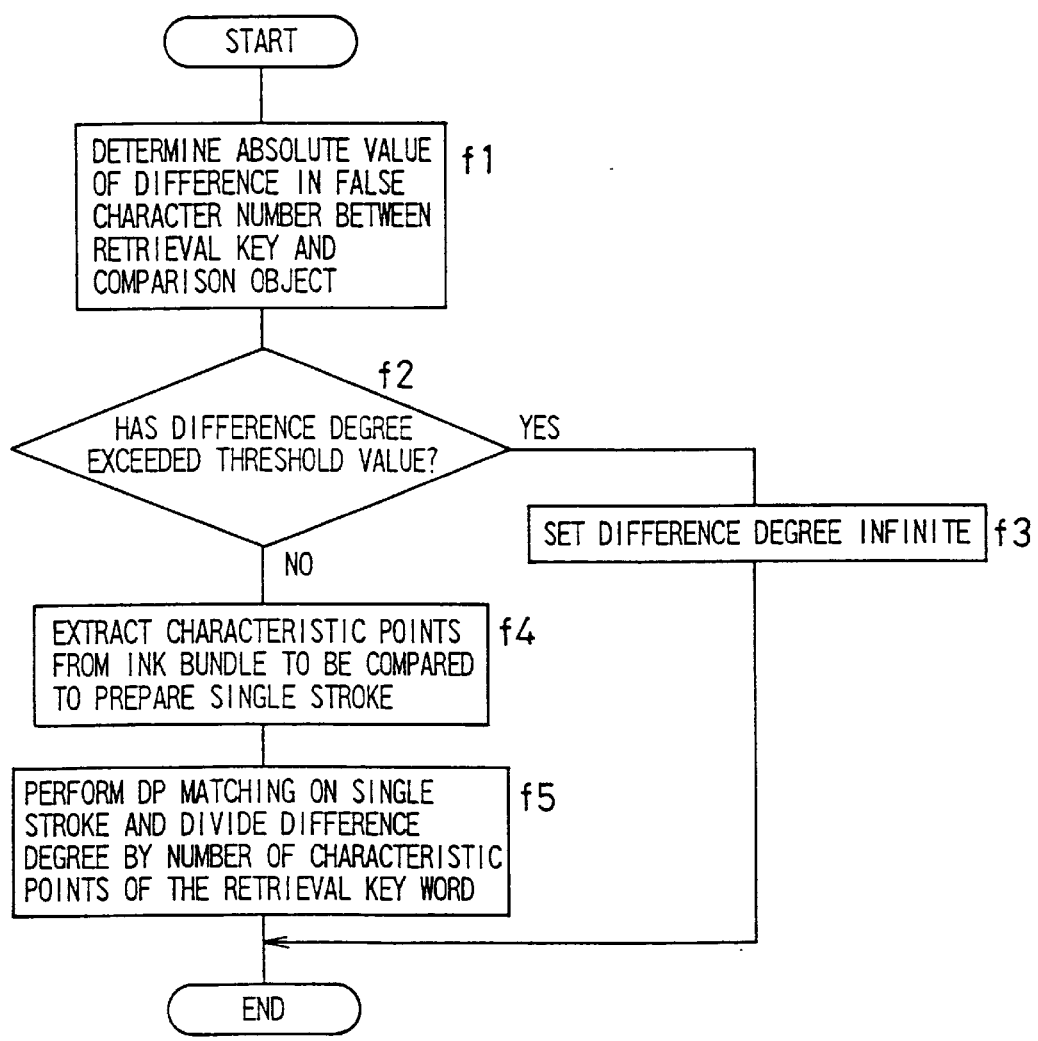
FIG. 14 is a flowchart for explaining in detail a comparison operation of step e4 of the retrieval process.

FIG. 14 is a flowchart for explaining in detail the comparison operation of step e4. In step f1, the absolute value of a difference between the dictionary pseudo-character, number 59 and the retrieval pseudo-character number 60 is obtained. In step f2, it is determined whether or not the absolute value of the difference between the pseudo-character numbers determined in step f1 exceeds the pseudo-character number difference threshold value 54 stored in the ROM 3. If it is determined that it exceeds the threshold value 54, the procedure proceeds to step f3. If it is determined that is does not exceed the threshold value, the procedure proceeds to step f4. In step f3, the difference degree is set to infinite and the comparison process is terminated.

In step f4, the dictionary stroke data 19 is subjected to the approximate reforming process, and the single-stroke data is prepared through the single-stroking process. This single-stroke data is stored in the dictionary stroke memory 58 of the RAM 6.

In step f5, the single-stroke data stored in the retrieval stroke memory 57 and the dictionary stroke memory 58 are compared through a DP matching process stored in the stroke collating processing procedure 53, and a difference degree is obtained. In the DP matching process, it is possible to use the method of *Applied Dynamic Programming* (Bellman, R. and Dreysus, S., Princeton University Press, 1962). Letting the ith direction data and the coordinate value of object data hd be hdi and (xdi, ydi), respectively; and letting the jth direction data and the coordinate value of the keyword data hf be hfj and (xfj, yfj), respectively; the difference degree score in the DP matching process is determined using the following equation:

$$d(i,j)=|hdi-hfj|+|xdi-xfj|+|ydi-yfj| \quad D(i,j)=\min(D(i,j-1), D(i-1,j), D(i-1,j-1))+d(i,j) \qquad (9)$$

The difference degree of the dictionary ink bundle, which is the object to be compared, is determined by dividing the difference degree score thus obtained by the number of characteristic points of the retrieval stroke.

As mentioned previously, according to the second embodiment, process is performed in character string units, as in the first embodiment, so the cutting process is unnecessary and the amount of data to be compared decreases. Consequently, retrieval process can be performed at high speed and stably. Also, it is possible to input characters through handwriting without interruption and without interrupting the train of thought of the operator.

In the second embodiment, to be specific, the dictionary stroke data are narrowed down by comparing the dictionary pseudo-character number 59 and the retrieval pseudo-character number 60, the dictionary stroke data and the retrieval stroke data is single-stroked, and thereby the dictionary stroke data 19 corresponding to the dictionary single-stroke data that best approximates the retrieval single-stroke data is selected.

Consequently, by preparing the single-stroke data, it is possible to retrieve even when cursive handwriting is input. The dictionary stroke data is retrieved based on the pseudo-character number comparison result and the single-stroke data comparison result, and matching with the character recognition dictionary is not performed, so it is possible to retrieve easily and highly efficiently, even for symbols and images not contained in the character recognition dictionary.

Also, by performing the computation of the pseudo-character numbers 59, 60 during registration, only the comparison of the pseudo-character numbers 59, 60 needs to be performed during retrieval, so the retrieval process can be reduced, and the time required for the retrieval process can be shortened. Also, it is possible to retrieve the ink bundle with a similar overall shape without being particular about the detailed shape.

In the second embodiment, during retrieval, the dictionary stroke data 19 is single-stroked to prepare the single-stroke data, after which the DP matching process is performed. However, the single-stroke data may be prepared during registration, to be stored with being related to the dictionary stroke data. In this manner, it is possible to increase the retrieval processing speed.

Also, in the second embodiment, an example of retrieval by comparing in software using the control part 2 or the like was explained. However, comparison and retrieval may be performed using a stroke collation LSI that is already used in character recognition technology. In the stroke collation LSI, a single stroke which is obtained by inputting stokes of a character to be recognized from an input part, subjecting the strokes to an approximate reforming, extracting characteristic points, and performing a single-stroking, is compared sequentially with the dictionary stroke in the dictionary ROM. By providing the stroke collation LSI with dictionary strokes prepared in advance from the dictionary ink bundles, instead of the single strokes obtained from the input characters, it is possible to determined the difference degree of the strokes at high speed. By using such a stroke collation LSI for the retrieval process, also, it is possible to perform the stroke collating process at high speed, without adding another circuit for stroke collation.

Also, in the second embodiment, the dictionary stroke data first are narrowed down using the pseudo-character number, and next, the dictionary stroke data is determined using the single-stroke data. However, examples that determine the dictionary stroke data using the single-stroke data, after narrowing down the dictionary stroke data using the number of strokes, also are within the scope of the present invention. The absolute value of the difference between the dictionary stroke number and the retrieval stroke number is obtained, as in the first embodiment, and the dictionary stroke data related to the dictionary stroke numbers within the predetermined threshold value, thereby allowing narrowing down using the number of strokes are selected.

Furthermore, the dictionary stroke data are narrowed down by using the stroke number in the first embodiment and the pseudo-character number in the second embodiment. However, also within the scope of the present invention are examples in which the dictionary stroke data is determined immediately using a transform coefficient, without performing narrowing down using the stroke number, and examples in which the dictionary stroke data is determined immediately using the single-stroke data, without performing narrowing down using the pseudo-character number.

Figure 15:
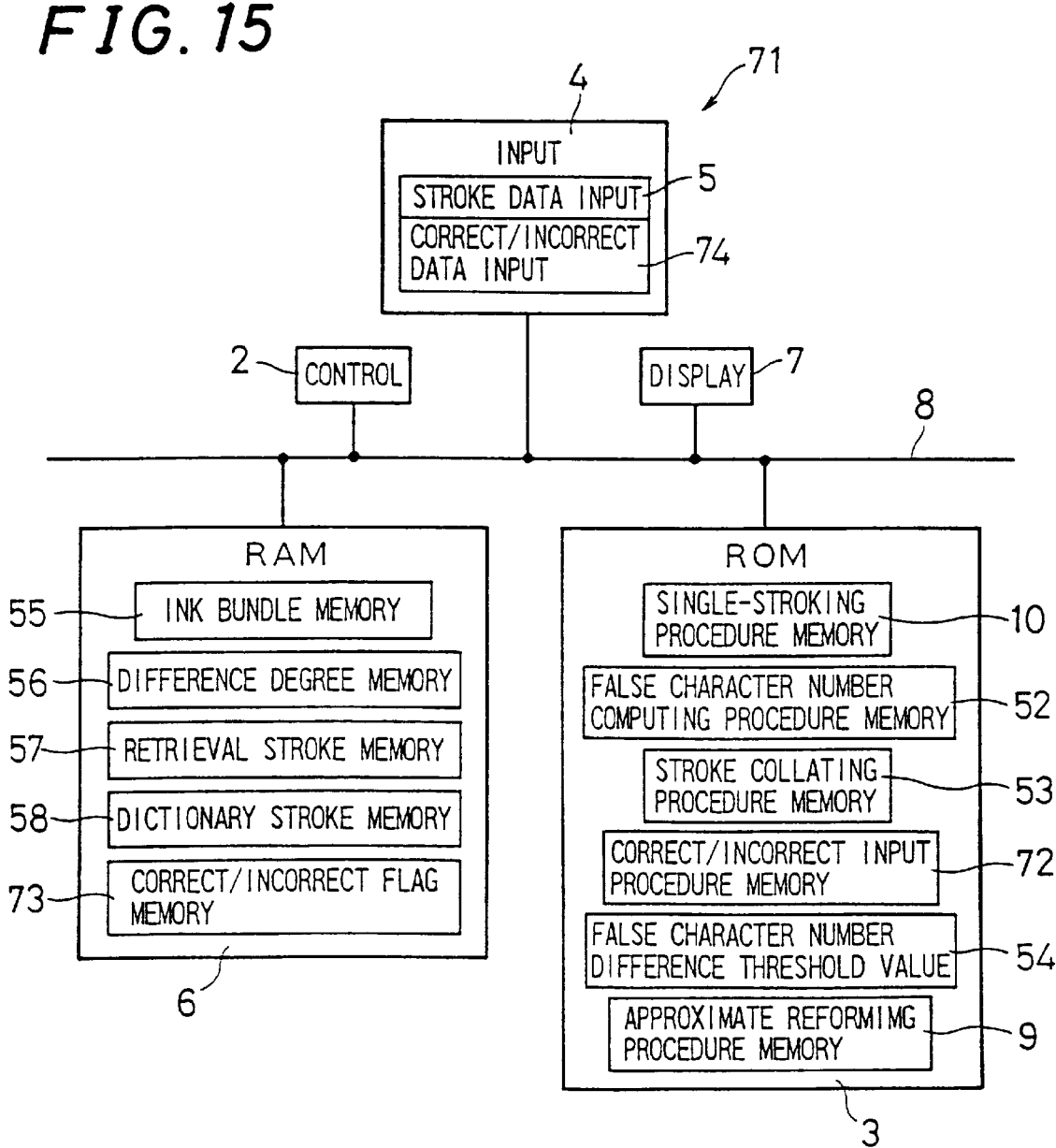
FIG. 15 is a block diagram showing an electrical structure of a handwritten character and symbol processing apparatus 71, which is a third embodiment of the present invention.

FIG. 15 is a block diagram showing an electrical structure of a handwritten character and symbol processing apparatus 71, which is a third embodiment of the present invention. The handwritten character and symbol processing apparatus 71 of the present embodiment is characterized in that the operator can input the correct/incorrect data that indicates whether or not the retrieval result is appropriate, the data is stored by means of a correct/incorrect flag, and the dictionary ink bundle specified by the correct/incorrect flag is considered as the object of replacement process.

In the case of the handwritten character and symbol processing apparatus 71 of the present embodiment, different from text data retrieval and replacement process, the dictionary ink bundle obtained as a result of the retrieval might be one not intended by the operator. As a result, in the present embodiment, the operator judges the retrieval result with his own eyes to indicate whether or not it is correct.

The handwritten character and symbol processing apparatus 71 is configured almost the same as the handwritten character and symbol processing apparatus 51, and comprises the control part 2, the ROM 3, the input part 4, the RAM 6, and the display 7 interconnected to each other by means of the system bus 8. The same reference numerals are attached to the same structural elements, so the explanations are omitted. The input part 4 comprises a correct/incorrect data input part 74, in addition to the stroke data input part 51.

The ROM 3 comprises a correct/incorrect input processing procedure memory 72, in addition to the approximate reforming processing procedure memory 9, the single-stroking processing procedure memory 10, the pseudo-character number computation processing procedure memory 52, and the stroke collating processing procedure memory 53. The control part 2 controls the operation of the overall device 71 according to the processes stored in these memories and elsewhere. As a result, the approximate reforming process for the stroke data, the single-stroking process, the pseudo-character number computing process, the stroke collating process, and the correct/incorrect input process are performed. The ROM 3 stores the pseudo-character number difference threshold value 54, in addition to the above mentioned processes.

The RAM 6 comprises a correct/incorrect flag memory 73, in addition to the ink bundle memory 55, the difference degree memory 56, the retrieval stroke memory 57, and the dictionary stroke memory 58.

Figure 16:
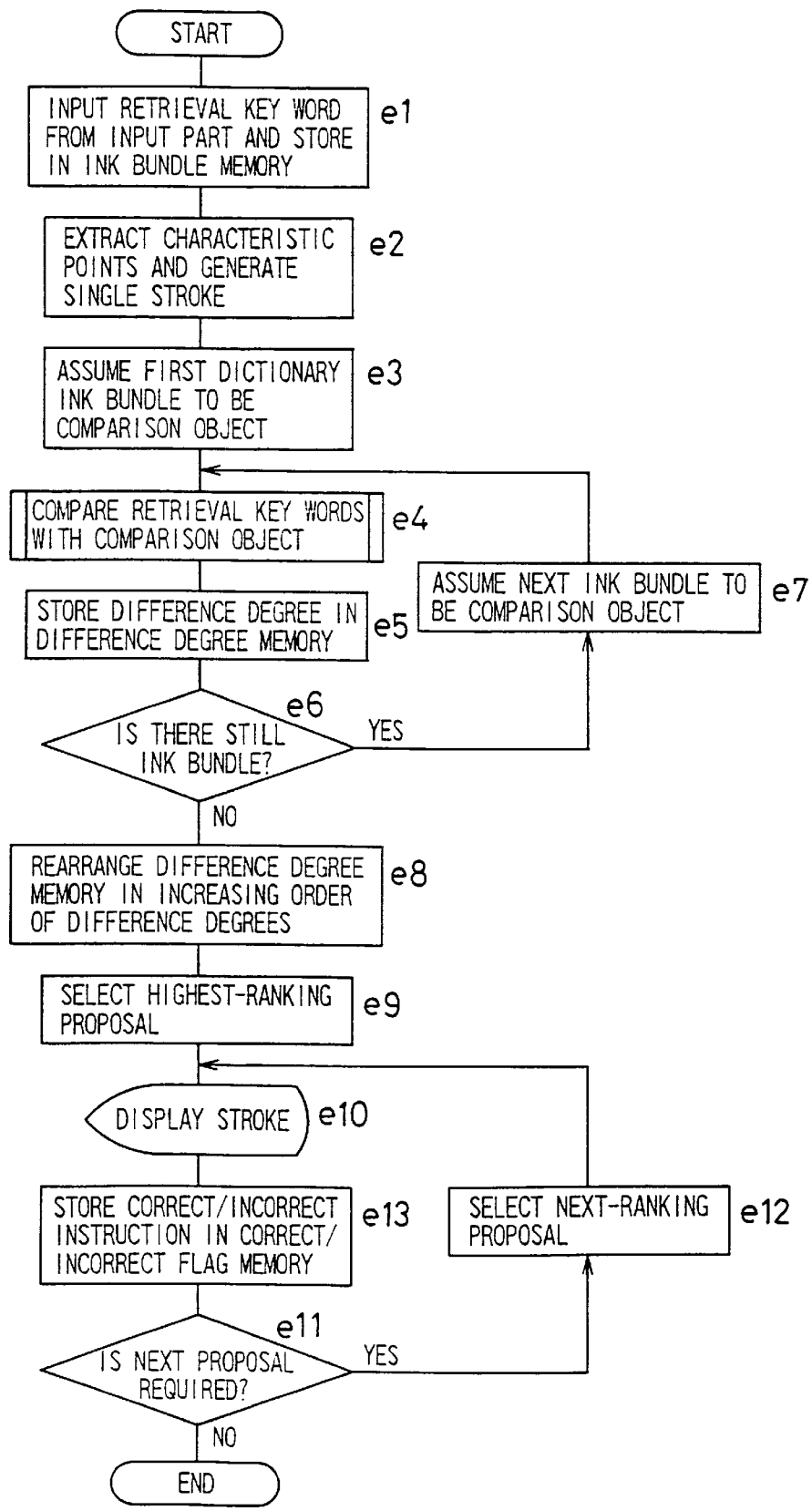
FIG. 16 is a flowchart for explaining a retrieval operation of the handwritten character and symbol processing apparatus 71.

FIG. 16 is a flowchart for explaining the retrieval operation of the handwritten character and symbol processing apparatus 71. The registration operation is performed in the same manner as in the second embodiment. The retrieval operation of the present embodiment is such that step e13 is added to the steps of FIG. 13, so common steps are omitted.

In step e13, after the characters and symbols based on the stroke data 19 of the dictionary ink bundles selected in step e10 are displayed on the display 7, the operator checks the displayed characters and symbols and judges whether or not they are appropriate to input the judgement via the correct/incorrect data input part 74. Based on the input, the correct/incorrect flag is related to a dictionary ink bundle and stored in the correct/incorrect flag memory 73. When the process of step e13 terminates, the procedure proceeds to step e11.

Figure 17:
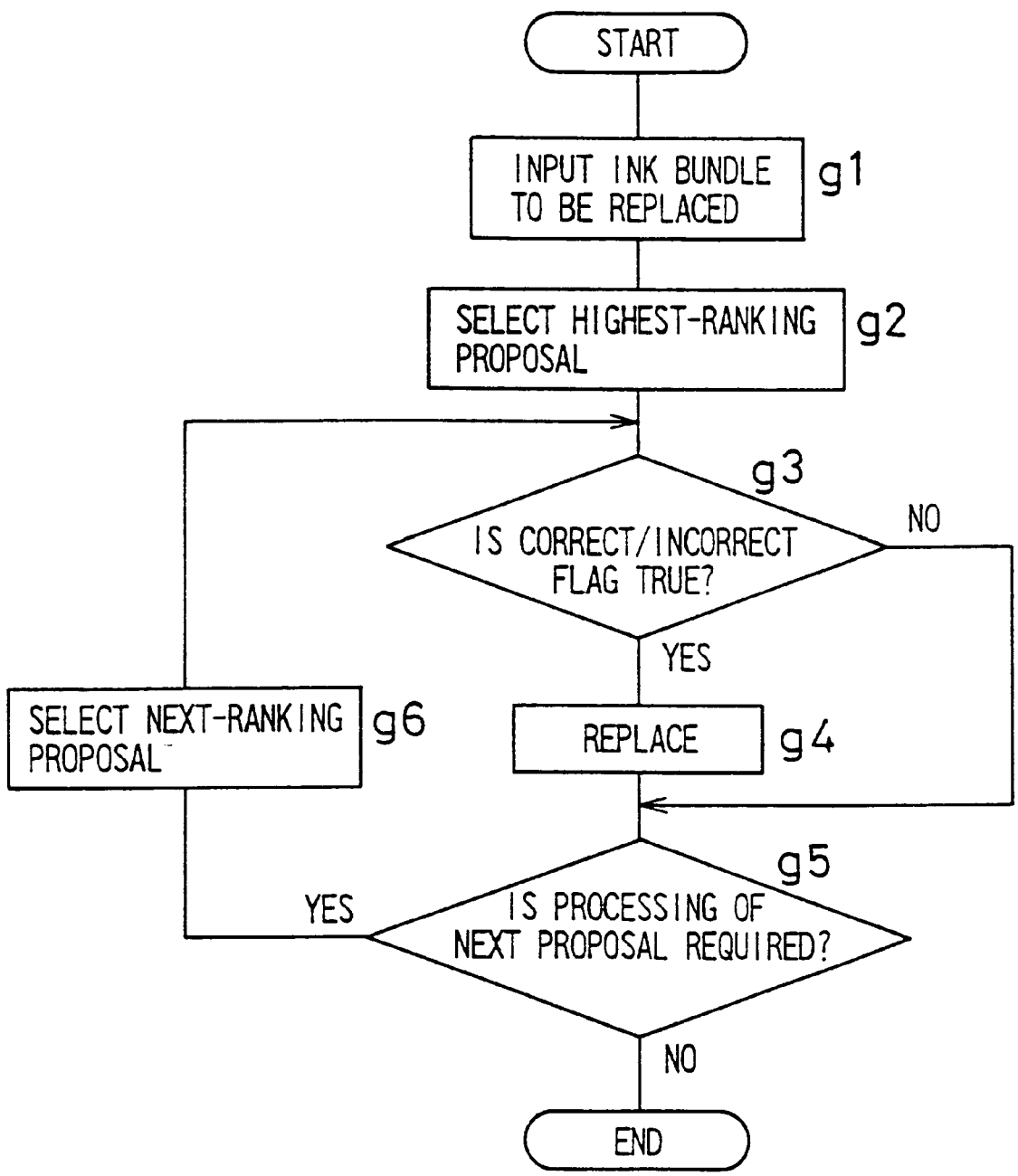
FIG. 17 is a flowchart for explaining a registration ink bundle replacement operation, which uses an correct/incorrect flag, of the handwritten character and symbol processing apparatus 71.

FIG. 17 is a flowchart for explaining the operation of replacing a dictionary ink bundle that uses the correct/incorrect flag. In step g1, as during registration, the ink bundle for replacement is input by handwriting, and the stroke data is stored in the ink bundle memory 55. Where, the data to be replaced is not limited to that input by handwritten, but may also be text data selected by character recognition.

In step g2, the dictionary ink bundle with highest-ranking difference degree, which was selected by the retrieval operation described above, is selected. In step g3, it is determined whether or not the correct/incorrect flag related to the selected ink bundle is true. If it is determined to be true, the procedure proceeds to step g4. If it is determined to be not true, the procedure proceeds to step g5.

In step g4, the dictionary ink bundle selected in step g2 is replaced by the ink bundle input in step g1. In step g5, it is determined whether or not it is necessary to process the next-ranking dictionary ink bundle. If it is determined that process is necessary, e.g. when the next-ranking dictionary ink bundle exists, the procedure proceeds to step g6. If it is determined that process is unnecessary, the replacement process is terminated. In step g6, the dictionary ink bundle with the next-ranking difference degrees is selected, and the procedure returns to step g3. Consequently, only the dictionary ink bundle of which the correct/incorrect flag is TRUE becomes the object of the replacement process. When the replacement process is continued, it is performed by calling a page that contains a specific ink bundle, for example, and replacement is performed by continuously inputting other words.

As mentioned above, according to the third embodiment, the correct/incorrect data input by the operator who has seen the characters and symbols displayed on the display 7 with his own eyes, are stored for each dictionary ink bundle data in the correct/incorrect flag memory 73 as the correct/incorrect flag. The dictionary ink bundle data indicated to be the desired character or symbol by means of the correct/incorrect data becomes the object to be replaced. Consequently, it is possible to replace only the appropriate character or symbol with another ink bundle data.

Furthermore, a medium which stores a program for performing such operations as explained in the first through third embodiments by means of the existing handwritten character and symbol processing apparatus is also within the scope of the present invention.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A handwritten character and symbol processing apparatus comprising:

stroke data input means including an input surface upon which information is input by handwriting using an input device, for outputting stroke data representative of information input by the input device from a start of contact with the input surface to an end of contact with the input surface;

ink bundle data preparation means for preparing ink bundle data from the stroke data of the input information, the ink bundle preparation means including first means for inputting a number of strokes of the input information, and second means for approximating each of the strokes of the input information using a predetermined number of broken lines of equal length and determining transform coefficients for the strokes of the input information based upon an orthogonal function;

dictionary storage means for storing the ink bundle data as dictionary ink bundle data and storing the stroke data in association therewith, as dictionary stroke data during stroke data registration;

temporary storage means for temporarily storing the ink bundle data as retrieval ink bundle data, during stroke data retrieval; and retrieval means for selecting dictionary stroke data related to dictionary ink bundle data best approximating the retrieval ink bundle data upon comparing the dictionary ink bundle data and the retrieval ink bundle data.

2. The handwritten character and symbol processing apparatus of claim 1, wherein the dictionary storage means includes dictionary transform coefficient storage means for storing the transform coefficients as dictionary transform coefficients and for storing the dictionary stroke data in association therewith, during registration;

the temporary storage means includes retrieval transform coefficient storage means for temporarily storing the transform coefficients as a retrieval transform coefficients, during retrieval; and the retrieval means compares the dictionary transform coefficients and the retrieval transform coefficients to select the dictionary stroke data related to the dictionary transform coefficients which best approximate the retrieval transform coefficients.

3. The handwritten character and symbol processing apparatus of claim 2, wherein the dictionary storage means further includes dictionary stroke number storage means for storing a number of strokes of the stroke data of the input information as a dictionary stroke number and for storing the dictionary stroke data in relation thereto, during registration;

the temporary storage means further includes retrieval stroke number storage means for temporarily storing the number of strokes of the stroke data of the input information as a retrieval stroke number, during retrieval; and the retrieval means determines an absolute value of a difference between the dictionary stroke number and the retrieval stroke number, selects the dictionary stroke data for which the absolute value of the difference is within a predetermined threshold value, compares the dictionary transform coefficients related to the selected dictionary stroke data and the retrieval transform coefficients, and selects the dictionary stroke data related to the dictionary transform coefficients which best approximate the retrieval transform coefficients.

4. The handwritten character and symbol processing apparatus of claim 2, wherein the ink bundle data preparation means further comprises pseudo-character number computation means for computing a pseudo-character number from the stroke data of the predetermined character string unit, the pseudo-character being based on an overall height and width of the information input from the start of contact to the end of contact;

the dictionary storage means further comprises dictionary pseudo-character number storage means for storing the pseudo-character number as a dictionary pseudo-character number in relation to the dictionary stroke data during registration;

the temporary storage means further comprises retrieval pseudo-character number storage means for temporarily storing the pseudo-character number as a retrieval pseudo-character number, during retrieval; and the retrieval means determines an absolute value of a difference between the pseudo-character number and the retrieval pseudo-character number, selects the dictionary stroke data related to the dictionary pseudo-character number for which the absolute value of the difference between the retrieval pseudo-character number is within a predetermined threshold value, compares the dictionary transform coefficients related to the selected dictionary stroke data and the retrieval transform coefficients, and selects the dictionary stroke data related to the dictionary transform coefficients which best approximate the retrieval transform coefficients.

5. The handwritten character and symbol processing apparatus of claim 2, wherein the ink bundle data preparation means further comprises characteristic point extraction means for extracting characteristic points of the stroke data of the input information to prepare characteristic point stroke data, and a single-stroking means, of the ink bundle data preparation means, substitutes the characteristic point stroke data for the stroke data of the input information.

6. The handwritten character and symbol processing apparatus of claim 1 further comprising display means for displaying characters or symbols based on the dictionary stroke data selected by the retrieval means.

7. The handwritten character and symbol processing apparatus of claim 6, further comprising data input means through which correct/incorrect data indicating whether or not the displayed characters or symbols are desired characters or symbols, wherein the dictionary storage means comprises data storage means for storing the correct/incorrect data for each dictionary ink bundle data, and the retrieval means regards the dictionary ink bundle data for which the characters or symbols are indicated to be desired ones by means of the correct/incorrect data, as an object to be replaced.

8. A medium which stores a program for controlling a computer of a handwritten character and symbol processing apparatus, the handwritten character and symbol processing apparatus including an input surface to which characters or symbols are input by an input device, the medium including, a first program segment adapted to control the computer to output stroke data representative of information input by the input device from a start of contact with the input surface to an end of contact with the input surface;

a second program segment adapted to control the computer to prepare ink bundle data from the stroke data of input information, input a number of strokes of the input information approximating each of the strokes and determine transform coefficients for the strokes;

a third program segment, adapted to control the computer to store the ink bundle data as dictionary ink bundle data and to store the stroke data as dictionary stroke data in association therewith during registration of the stroke data;

a fourth program segment, adapted to control the computer to temporarily store the ink bundle data as retrieval ink bundle data, during retrieval of the stroke data; and a fifth program segment, adapted to control the computer to compare the dictionary ink bundle data and the retrieval ink bundle data to select the dictionary stroke data related to the dictionary ink bundle data which best approximates the retrieval ink bundle data, during retrieval.

* * * * *